United States Patent
Kozonoi et al.

(10) Patent No.: US 12,453,336 B2
(45) Date of Patent: Oct. 28, 2025

(54) BRDC SIGN DETECTING SYSTEM

(71) Applicant: Nitto Denko Corporation, Ibaraki (JP)

(72) Inventors: Nobuyuki Kozonoi, Ibaraki (JP);
Yoichi Kigawa, Ibaraki (JP);
Kazumasa Okada, Ibaraki (JP);
Tatsuya Kitahara, Ibaraki (JP);
Naruyoshi Itadani, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 1167 days.

(21) Appl. No.: 17/296,696

(22) PCT Filed: Nov. 20, 2019

(86) PCT No.: PCT/JP2019/045466
§ 371 (c)(1),
(2) Date: May 25, 2021

(87) PCT Pub. No.: WO2020/110862
PCT Pub. Date: Jun. 4, 2020

(65) Prior Publication Data
US 2022/0053737 A1    Feb. 24, 2022

(30) Foreign Application Priority Data

Nov. 29, 2018  (JP) ................. 2018-223742
Nov. 13, 2019  (JP) ................. 2019-205357

(51) Int. Cl.
*A01K 29/00*  (2006.01)
*G06N 20/00*  (2019.01)

(52) U.S. Cl.
CPC ............. *A01K 29/00* (2013.01); *G06N 20/00* (2019.01)

(58) Field of Classification Search
CPC ........ A61B 5/08; A61B 5/4842; A61B 5/7271
See application file for complete search history.

(56) References Cited

U.S. PATENT DOCUMENTS

2013/0281871 A1    10/2013  White et al.
2017/0049392 A1*    2/2017  Brattain ............... A61B 5/7275
(Continued)

FOREIGN PATENT DOCUMENTS

EP    3603388 A1    2/2020
JP    2018-23377 A   2/2018
(Continued)

OTHER PUBLICATIONS

Office Action issued on Apr. 18, 2023 for corresponding Brazilian Patent Application No. BR112021009480-6, along with an English translation (7 pages).
(Continued)

*Primary Examiner* — Eric F Winakur
(74) *Attorney, Agent, or Firm* — Hauptman Ham, LLP

(57) ABSTRACT

A BRDC sign detecting system includes: a processor, and a memory storing program instructions that cause the processor to obtain, with respect to a bovine developing bovine respiratory disease complex (BRDC) within a time period required for a fattening process, data indicating a condition of the bovine during a predetermined time period in which the bovine did not yet develop the BRDC, and obtain data indicating a condition, during a predetermined time period, of a bovine that has not developed BRDC perform machine learning with respect to a correspondence relation between the obtained data indicating the condition during the predetermined time period and information indicating whether BRDC is developed, and infer, by inputting data indicating a condition of a new bovine during the predetermined time period into a learned model generated by performing the machine learning, information indicating whether the new bovine will develop BRDC and output an inference result.

5 Claims, 23 Drawing Sheets

(56) References Cited

U.S. PATENT DOCUMENTS

2018/0108440 A1 4/2018 Stevens et al.
2019/0053470 A1* 2/2019 Singh .................. A01K 29/005
2019/0385332 A1 12/2019 Yajima et al.

FOREIGN PATENT DOCUMENTS

| JP | 2018-170969 A | 11/2018 |
|---|---|---|
| WO | 2016/171077 A1 | 10/2016 |
| WO | 2018/105222 A1 | 6/2018 |

OTHER PUBLICATIONS

Extended European Search Report issued on Jul. 25, 2022 for corresponding European Patent Application No. 19891213.1 (9 pages).

Vandermeulen et al., "Early recognition of bovine respiratory disease in calves using automated continuous monitoring of cough sounds", Computers and Electronics in Agriculture, vol. 129, Sep. 22, 2016, pp. 15-26 (12 pages), cited in NPL No. 1.

International Search Report issued for corresponding International Patent Application No. PCT/JP2019/045466 on Dec. 17, 2019, along with an English translation.

Written Opinion issued for corresponding International Patent Application No. PCT/JP2019/045466 on Dec. 17, 2019.

Cargill, "Cargill brings facial recognition capability to farmers through strategic equity investment in Cainthus", Jan. 31, 2018 [https://www.cargill.com/2018/cargill-brings-facial-recognition-capability-to-farmers] (Retrieved on Jul. 31, 2018), cited in the Specification.

* cited by examiner

| SENSOR (SENSOR ID = 001) | | |
|---|---|---|
| MEASUREMENT ITEM | MEASUREMENT SITE | MEASURING ELEMENT |
| ACCELERATION | HEAD | FIRST ACCELERATION SENSOR |
| | BELLY | SECOND ACCELERATION SENSOR |
| TEMPERATURE | NECK | TEMPERATURE SENSOR |
| SOUND | BELLY | SOUND SENSOR |

2a

2b

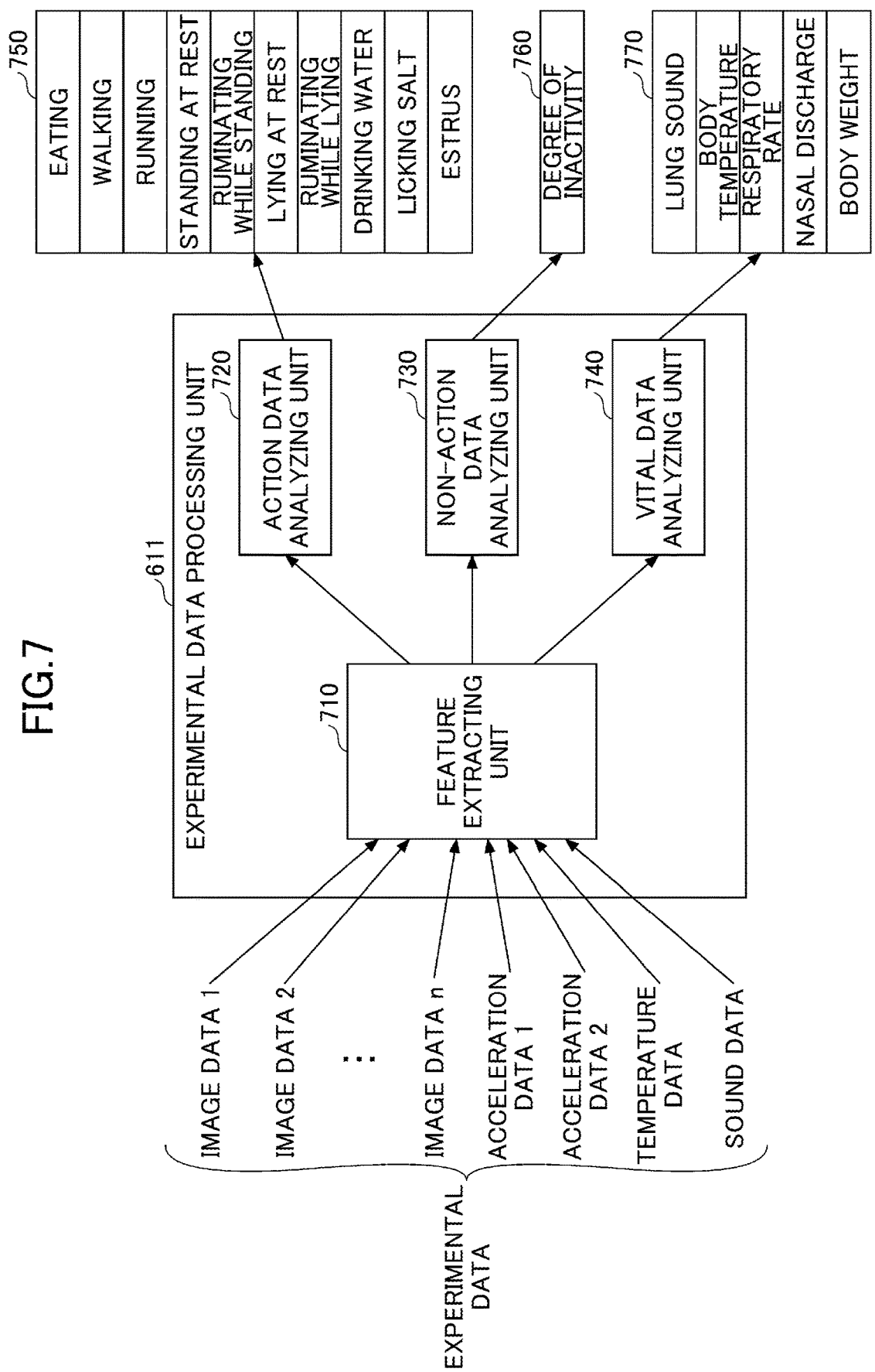

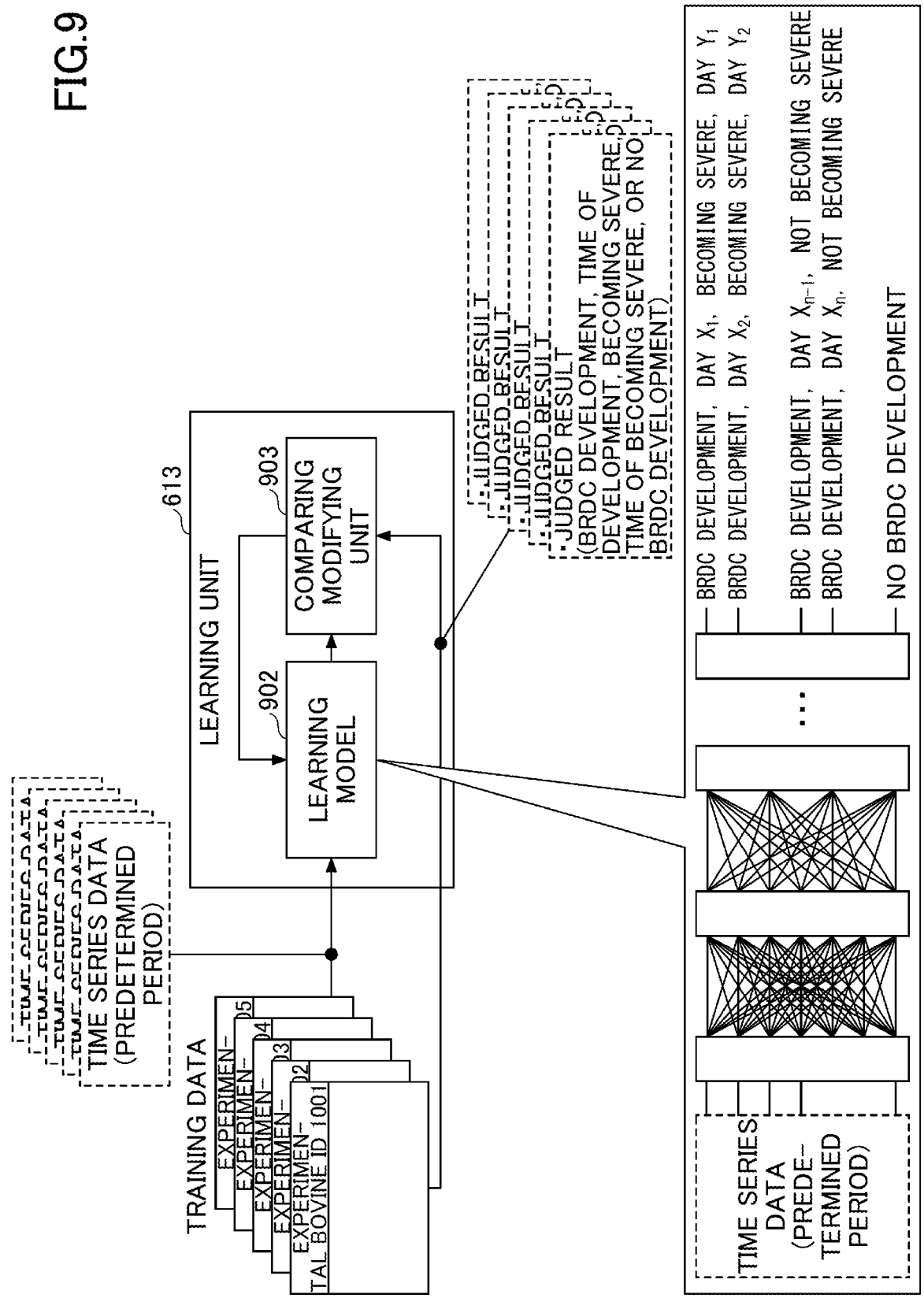

FIG.12

| SIGN DETECTION DATA ||
|---|---|
| IDENTIFICATION DATA | BOVINE ID = 001 |
| DATA ITEM | TIME SERIES DATA |
| EATING | |
| WALKING | |
| RUNNING | |
| STANDING AT REST | |
| ⋮ | ⋮ |
| DEGREE OF INACTIVITY | |
| LUNG SOUND | |
| BODY TEMPERATURE | |
| ⋮ | ⋮ |

1001

+

1201

| RESULT DATA | JUDGED RESULT: BRDC DEVELOPMENT (TIME OF DEVELOPMENT: DAY XX) BECOMING SEVERE (TIME OF BECOMING SEVERE: DAY YY) |
|---|---|

FIG.19

| | 1701 |
|---|---|
| SIGN DETECTION DATA | |
| IDENTIFICATION DATA | BOVINE ID = 001 |
| PREVIOUS DATA | GRAZING DATA |
| DATA ITEM | TIME SERIES DATA |
| EATING | |
| WALKING | |
| RUNNING | |
| STANDING AT REST | |
| ⋮ | ⋮ |
| DEGREE OF INACTIVITY | |
| LUNG SOUND | |
| BODY TEMPERATURE | |
| ⋮ | ⋮ |

+

1901

| | |
|---|---|
| RESULT DATA | JUDGED RESULT: BRDC DEVELOPMENT (TIME OF DEVELOPMENT: DAY XX) BECOMING SEVERE (TIME OF BECOMING SEVERE: DAY YY) |

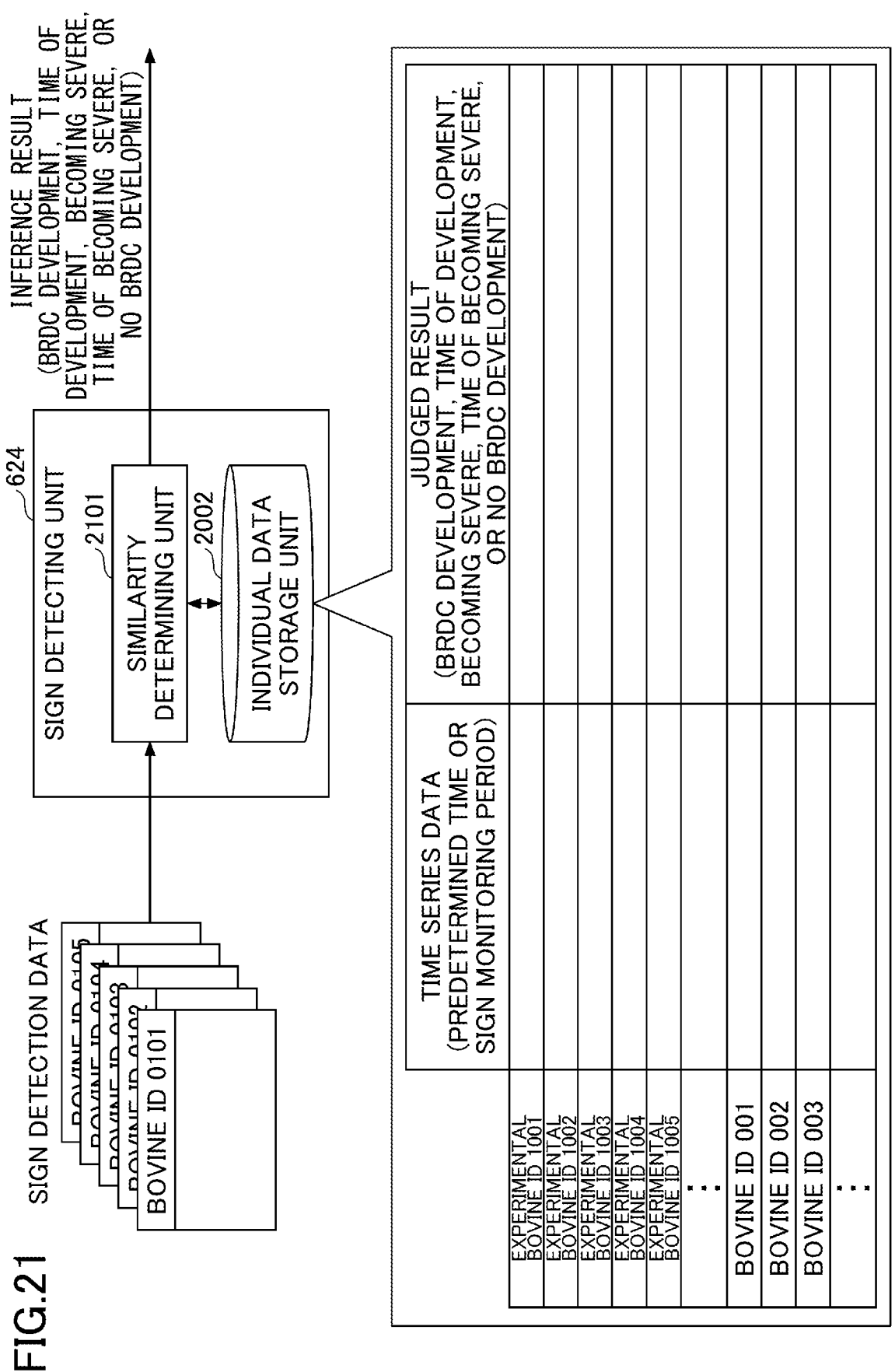

BRDC SIGN DETECTING SYSTEM

CROSS REFERENCE TO RELATED APPLICATION

This application is a National Stage of International Application No. PCT/JP2019/045466, filed on Nov. 20, 2019, which designates the United States and was published in Japan, and which is based upon and claims priority to Japanese Patent Application Nos. 1) 2018-223742, filed on Nov. 29, 2018; and 2) 2019-205357, filed on Nov. 13, 2019 in the Japan Patent Office. All of the aforementioned applications are hereby incorporated by reference in their entireties.

TECHNICAL FIELD

The present invention relates to a BRDC sign detecting system.

BACKGROUND ART

Generally, a flow from breeding to sales in cattle is broadly divided into multiple processes (e.g. a grass feeding process, a fattening process, a processing process, and the like). Among these, because a feedlot is within a certain area, there is a problem in that cattle can easily get infected with bovine respiratory disease complex (BRDC).

With respect to the above, for example, Non-Patent Document 1 below proposes a system that automatically detects a bovine that has actually developed BRDC among bovines infected with BRDC. The system can identify a bovine that has developed BRDC earlier.

RELATED ART DOCUMENTS

Patent Document

Non-Patent Document 1: Cargill, "Cargill brings facial recognition capability to farmers through strategic equity investment in Cainthus", [online], 31 Jan. 2018 [searched on 31 Jul. 2018], Internet (URL:https://www.cargill.com/2018/cargill-brings-facial-recognition-capability-to-farmers)

SUMMARY OF THE INVENTION

Problem to be Solved by the Invention

If a bovine can be treated before a bovine has developed BRDC by identifying a sign, it is conceivable that various costs caused associated with the BRDC development and becoming severe BRDC may be reduced.

According to one aspect, it is an object to provide a BRDC sign detecting system that detects a sign of BRDC.

Means for Solving the Problem

According to one aspect, a BRDC sign detecting system includes an obtaining unit configured to obtain, with respect to a bovine developing bovine respiratory disease complex (BRDC) within a time period required for a fattening process, data indicating a condition of the bovine during a predetermined time period in which the bovine did not yet develop the BRDC, and obtain data indicating a condition, during a predetermined time period, of a bovine that has not developed BRDC as of an end of the time period required for the fattening process, a machine learning unit configured to perform machine learning with respect to a correspondence relation between the obtained data indicating the condition during the predetermined time period and information indicating whether BRDC is developed, and an inference unit configured to infer, by inputting data indicating a condition of a new bovine during the predetermined time period into a learned model generated by performing the machine learning with respect to the correspondence relation, information indicating whether the new bovine will develop BRDC and output an inference result.

Advantageous Effect of the Present Invention

A BRDC sign detecting system that detects a sign of BRDC can be provided.

BRIEF DESCRIPTION OF THE DRAWINGS

FIG. 7 is a drawing illustrating an experimental data processing unit in detail;

FIG. 9 is a first drawing illustrating the learning unit in detail;

FIG. 12 is a third drawing illustrating an example of the training data stored in the training data storage unit;

FIG. 19 is a sixth drawing illustrating an example of the training data stored in the training data storage unit;

FIG. 21 is a third drawing illustrating the sign detecting unit in detail.

EMBODIMENTS FOR CARRYING OUT THE INVENTION

Figure 1:
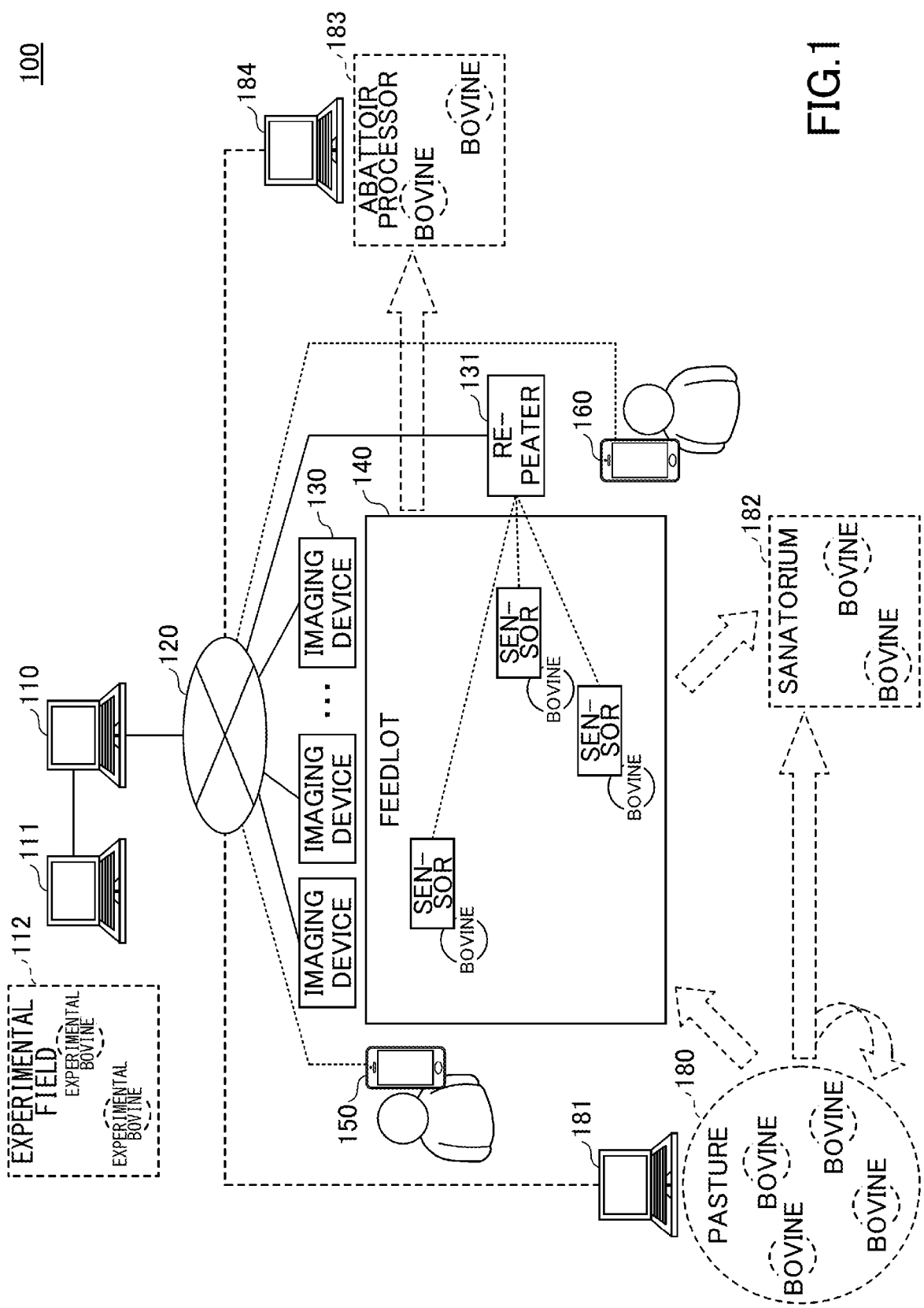
FIG. 1 is a drawing illustrating an example of a system configuration of a BRDC sign detecting system.

In the following, embodiments will be described with reference to the drawings. In the present specification and the drawings, components having substantially the same functional configuration are referenced by the same reference numerals, and the overlapping description is omitted.

First Embodiment

<System Configuration of a BRDC Sign Detecting System>

First, a system configuration of a BRDC sign detecting system will be described. FIG. 1 is a drawing illustrating an example of the system configuration of the BRDC sign detecting system.

The BRDC sign detecting system 100 is a system that detects a sign of the BRDC development in each bovine within a feedlot 140 during the fattening process.

As illustrated in FIG. 1, the BRDC sign detecting system 100 includes a detecting device 110, a learning device 111, an imaging device group 130, a repeater 131 (and a sensor wirelessly connected to the repeater), a terminal device 150, and a terminal device 160. In the BRDC sign detecting system 100, the detecting device 110 is communicatively connected to the imaging device group 130, the repeater 131, the terminal device 150, and the terminal device 160 through a network 120.

The detecting device 110 receives image data captured by the imaging device group 130 and measurement data measured by sensors attached to a bovine through the repeater 131. The detecting device 110 detects a sign of the BRDC development in each bovine based on the received image data and the measured data (hereinafter referred to as feedlot data).

In a case of detecting a sign of the BRDC development, the detecting device 110 determines a treatment to be administered to the bovine. As a result of the determination, if a medication treatment is to be taken to the bovine, a medication instruction is output to the terminal device 150. Additionally, as a result of the determination, if the bovine is to be given isolation treatment, an isolation instruction is output to the terminal device 160.

The learning device 111 generates a learned model used when the detecting device 110 detects a sign of the BRDC development and provides the learned model to the detecting device 110. The learning device 111 collects captured image data and measured measurement data (hereinafter referred to as "experimental data") from the point of BRDC infection to the onset of BRDC symptoms for experimental bovines in an experimental field 112 and generates the learned model on which machine learning is performed.

Additionally, the learning device 111 modifies the generated learned model based on the feedlot data collected by the detecting device 110 with respect to the bovines in the feedlot 140.

The imaging device group 130 is disposed around the feedlot 140 to capture images of the bovines in the feedlot 140. The imaging device group 130 transmits the captured image data to the detecting device 110 through the network 120.

The repeater 131 receives measurement data measured by sensors attached to the bovines in the feedlot 140 through wireless communication and transmits the received measurement data to the detecting device 110 via the network 120.

The terminal device 150 is a terminal carried by a fattener manager who manages each of the bovines in the feedlot 140 and notifies the fattener manager when the medication instruction is received from the detecting device 110. This enables the fattener manager to identify the bovine for which the medication instruction has been output and to administer medication.

The terminal device 160 is a terminal carried by another fattener manager who manages each of the bovines in the feedlot 140 and notifies another fattener manager when the isolation instruction is output from the detecting device 110. This enables another fattener manager to identify the bovine for which the isolation instruction has been output and to transfer the bovine from the feedlot 140 to a sanatorium 182 to provide the isolation treatment.

FIG. 1 also illustrates devices other than the BRDC sign detecting system 100 and the transfer of bovines other than the fattening process. Among these, a terminal device 181 transmits grazing data obtained by managing bovines grass-fed in a pasture 180 to the detecting device 110 through the network 120.

Each of the bovines grass-fed at the pasture 180 is transferred to the feedlot 140 after the grass feeding process is completed and the fattening process is started in the feedlot 140. At the time of transferring the bovine to the feedlot 140, each of the bovines is checked and returned to the pasture 180 depending on a growth state. A bovine infected with BRDC or having developed BRDC is transferred to the sanatorium 182.

With respect to the above, each of the bovines for which the fattening process has been started in the feedlot 140 is transferred to an abattoir processor 183 when the fattening process is completed after a time period required for the fattening process (i.e., the time period required for fattening) has elapsed. A terminal device 184 manages each of the bovines for which the fattening process has been performed and that has been transferred to the abattoir processor 183. Specifically, the terminal device 184 collects data obtained during a time period in which each of the transferred bovines is processed and shipped by the abattoir processor 183, and transmits the data as process data to the detecting device 110.

<Description of a Sensor>

Figure 2:
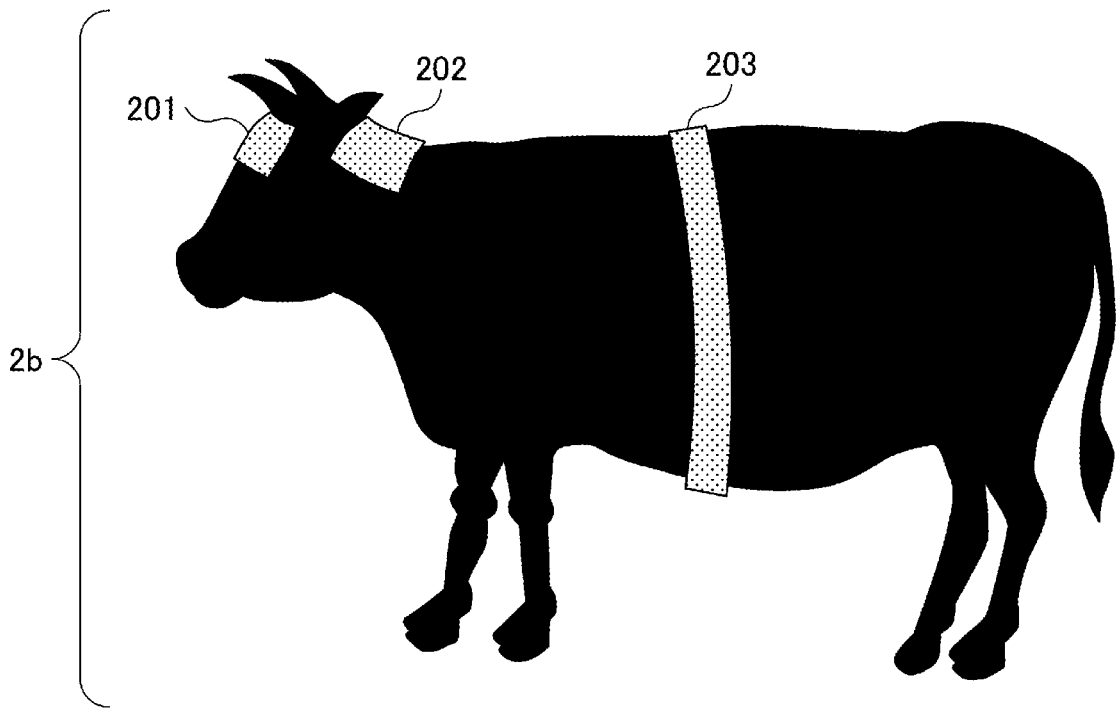
FIG. 2 is a drawing illustrating sensors attached to a bovine and positions where the sensors are attached.

Next, a sensor attached to each of the bovines in the feedlot 140 will be described. FIG. 2 illustrates the sensors attached to the bovine and the position where the sensors are attached.

As illustrated in 2a of FIG. 2, to the bovines in the feedlot 140, sensors having different sensor IDs for respective bovines are attached. The example in 2a of FIG. 2 illustrates a sensor having a sensor ID="001" attached to a bovine having a bovine ID="001".

The sensors attached to each of the bovines include a group of multiple measurement elements, classified into the "acceleration," the "temperature," and the "sound" according to the measurement items. A measurement site is defined for each of the measurement items of the sensors attached to each of the bovines, and the measurement element is attached to each measurement site.

For example, the "acceleration" is measured at the "head" and "belly" of the bovine, and a "first acceleration sensor" and a "second acceleration sensor" are attached to the respective parts. The "temperature" is measured at the "neck" of the bovine and a "temperature sensor" is attached to the part. Further, the "sound" is measured at the "belly" of the bovine and a "sound sensor" is attached to the part.

In 2b of FIG. 2, an example of attaching the group of multiple measurement elements included in the sensor. In 2b of FIG. 2, a mounting fixture 201 is attached to the head of the bovine to perform various measurements at the head of the bovine. According to the example of 2a of FIG. 2, to the mounting fixture 201, the "first acceleration sensor" is attached. The mounting fixture 202 is attached to the neck of the bovine to perform various measurements on the neck of the bovine. According to the example of 2a of FIG. 2, to the mounting fixture 202, the "temperature sensor" is attached. Further, the mounting fixture 203 is attached to the belly of the bovine to perform various measurements at the belly of the bovine. According to the example of 2a of FIG. 2, to the mounting fixture 203, the "second acceleration sensor" and the "sound sensor" are attached.

Here, measurement data measured by the sensors is transmitted to the repeater 131 at a predetermined period in association with the sensor ID by a transmitter (which is not illustrated). Thus, the detecting device 110 can receive the measurement data (i.e., first acceleration data, second acceleration data, temperature data, and sound data) associated with the sensor ID at a predetermined period.

<Example Layout of an Imaging Device Group>

Figure 3:
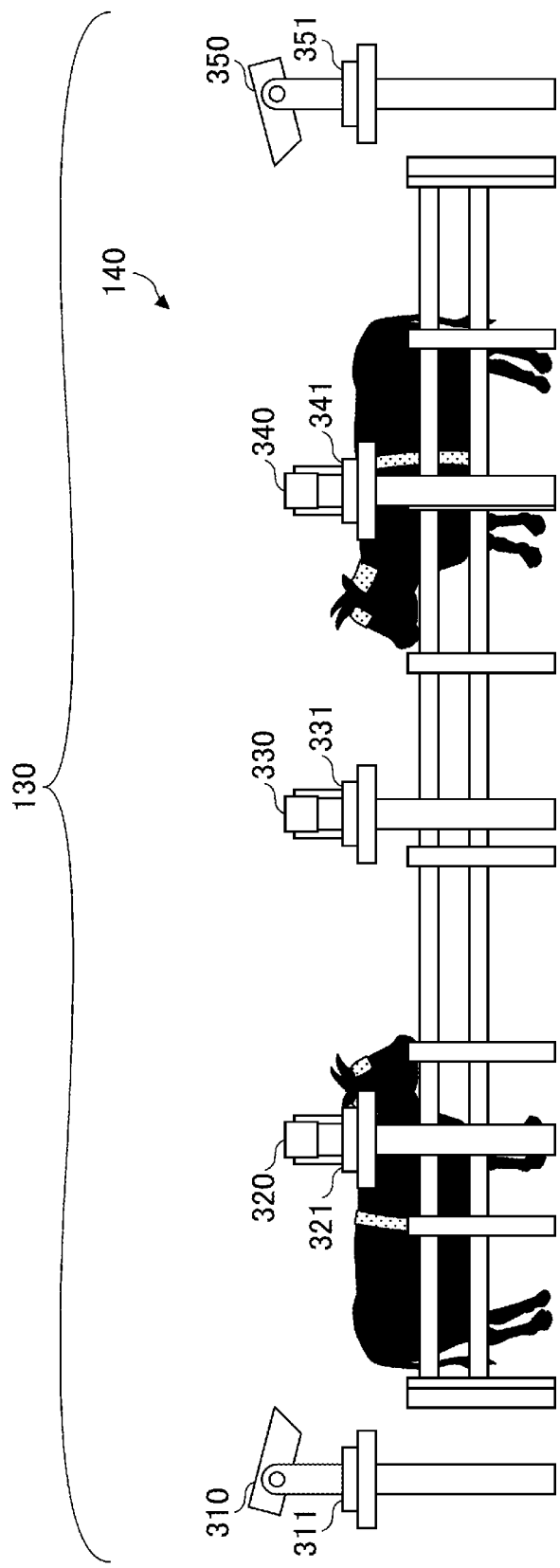
FIG. 3 is a drawing illustrating an example layout of an imaging device group in a feedlot.

Next, an example layout of an imaging device group 130 in the feedlot 140 will be described. FIG. 3 is a drawing illustrating an example layout of the imaging device group in the feedlot. The example of FIG. 3 indicates a state in which five imaging devices 310, 320, 330, 340, and 350 disposed around the feedlot 140 as the imaging device group 130.

As illustrated in FIG. 3, the imaging devices 310, 320, 330, 340, and 350 are installed on mounts 311, 321, 331, 341, and 351, respectively, and imaging ranges in a horizontal direction are defined so that an entire area within the feedlot 140 can be imaged. Imaging range in a height direction of the imaging devices 310, 320, 330, 340, and 350 are also defined so that an image of a standing state to an image of a lying state of the bovine can be taken.

The imaging devices 310, 320, 330, 340, and 350 may all be visible light cameras that detect visible light, or some may be infrared cameras that detect infrared light. Additionally, the mounts 311, 321, 331, 341, and 351 may be fixed mounts or movable mounts (i.e., mounts that moves in pan, tilt, and roll directions).

In the example of FIG. 3, due to space limitation, only five imaging devices are illustrated, but the number of imaging devices disposed in the feedlot 140 is not limited to five.

<Hardware Configuration of the Detecting Device and the Learning Device>

Next, a hardware configuration of the detecting device 110 and the learning device 111 will be described. Here, the detecting device 110 and the learning device 111 have substantially the same hardware configuration, and thus the hardware configuration of the detecting device 110 will be described here.

Figure 4:
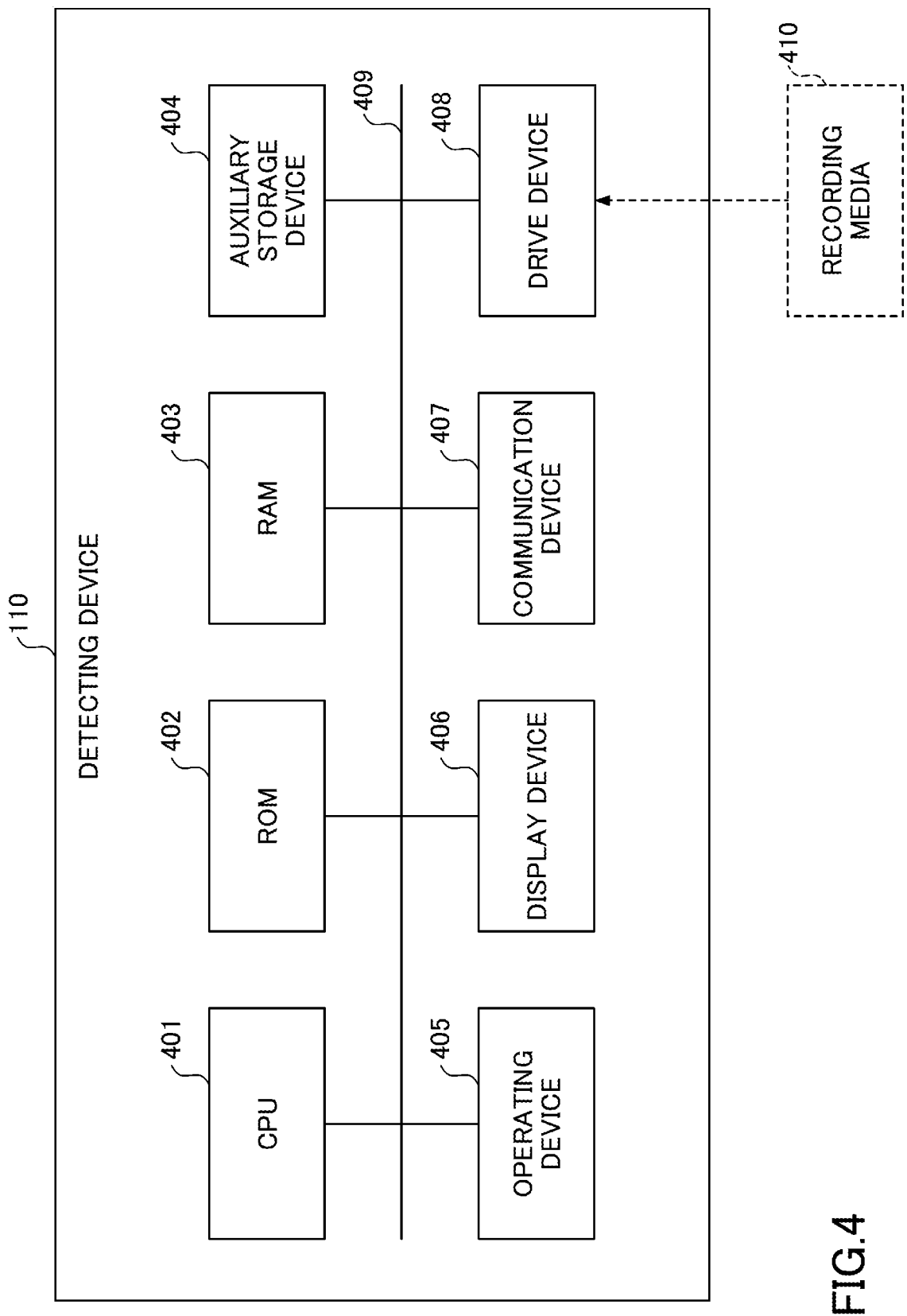
FIG. 4 is a drawing illustrating an example of a hardware configuration of a detecting device.

FIG. 4 is a drawing illustrating an example of the hardware configuration of the detecting device. As illustrated in FIG. 4, the detecting device 110 includes a central processing unit (CPU) 401, a read only memory (ROM) 402, and a random access memory (RAM) 403. The CPU 401, the ROM 402, and the RAM 403 form what is called a computer. The detecting device 110 also includes an auxiliary storage device 404, an operating device 405, a display device 406, a communication device 407, and a drive device 408. Each hardware component of the detecting device 110 is interconnected through a bus 409.

The CPU 401 executes various programs installed in the auxiliary storage device 404 (e.g., a sign detection program which will be described later).

The ROM 402 is a non-volatile memory and functions as a main storage device. The ROM 402 stores various programs, data, and the like required for the CPU 401 to execute various programs installed in the auxiliary storage device 404. Specifically, the ROM 402 stores a boot program and the like, such as basic input/output system (BIOS) and extensible firmware interface (EFI).

The RAM 403 is a volatile memory, such as a dynamic random access memory (DRAM) or a static random access memory (SRAM), and functions as a main storage device. The RAM 403 provides a workspace where various programs installed in the auxiliary storage device 404 are deployed when the various programs are executed by the CPU 401.

The auxiliary storage device 404 stores various programs, data collected by the CPU 401 executing various programs, data generated by processing the collected data, and the like. For example, a sign detection data storage unit, which will be described later, is implemented by the auxiliary storage device 404.

The operating device 405 is an input device used when an administrator of the detecting device 110 inputs various instructions to the detecting device 110. The display device 406 is a display device that displays various information to the administrator of the detecting device 110.

The communication device 407 is a communication device that connects to the network 120 and communicates with each device (i.e., the imaging device group 130, the repeater 131, the terminal device 150, the terminal device 160, the terminal device 181, the terminal device 184, or the like).

The drive device 408 is a device for setting a recording medium 410. The recording medium 410 includes a medium that optically, electrically, or magnetically records information, such as a CD-ROM, a flexible disk, a magneto-optical disk, and the like. Additionally, the recording medium 410 may include a semiconductor memory or the like that electrically records information, such as a ROM, a flash memory, and the like.

The various programs installed in the auxiliary storage device 404 are installed, for example, when the distributed recording medium 410 is set in the drive device 408 and the various programs recorded in the recording medium 410 are read by the drive device 408. Alternatively, the various programs installed on auxiliary storage device 404 may be installed by downloading through the network 120.

<A Flow of a Process Performed by the BRDC Sign Detecting System>

Figure 5:
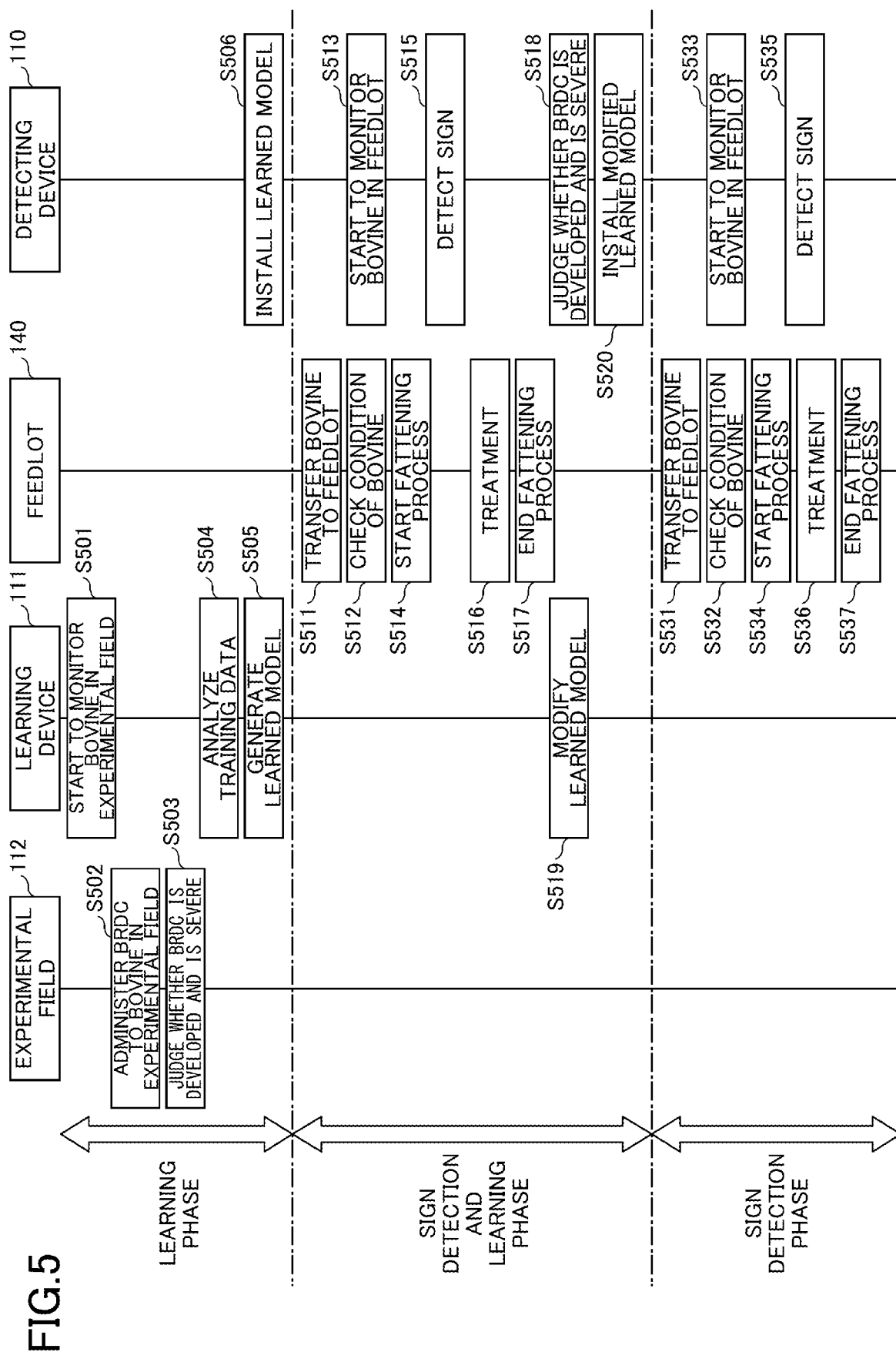
FIG. 5 is a sequence diagram illustrating a flow of an entire process of the BRDC sign detecting system.

Next, a flow of an entire process of the BRDC sign detecting system 100 will be described with reference to FIG. 5. FIG. 5 is a sequence diagram illustrating the flow of the entire process of the BRDC sign detecting system.

As illustrated in FIG. 5, the process of the BRDC sign detecting system 100 can be divided into a learning phase, a sign detection and learning phase, and a sign detection phase.

Among these, the learning phase is a phase in which a learned model used by the detecting device 110 to detect a sign of the BRDC development is generated. The sign detection and learning phase is a phase in which the detecting device 110 detects a sign of the BRDC development using the learned model and modifies the learned model. Further, the detection phase is a phase in which the detecting device 110 detects a sign of the BRDC development by using the modified learned model.

As illustrated in FIG. 5, in response to starting the learning phase, in step S501, the learning device 111 starts to monitor the bovines in the experimental field 112 and collects experimental data. Although not illustrated in FIG. 1, it is assumed that a system similar to the system in the feedlot 140 is reproduced in the experimental field 112. That is, the learning device 111 can collect image data imaging the experimental bovine and measurement data measured by the sensors attached to the experimental bovine as the experimental data.

In step S502, an experimenter administers a virus or bacteria causing BRDC to each of the experimental bovines in the experimental field 112 and infects each of the experimental bovines with BRDC.

In step S503, the experimenter judges whether any experimental bovine has developed BRDC and whether any BRDC experimental bovine has become severe from among the experimental bovines infected with BRDC. The judgement of whether each of the experimental BRDC bovines has developed BRDC and whether each of the experimental bovine has become severe is performed based on, for example, whether a clinical score exceeds a predetermined threshold, with the experimenter judging daily clinical scores.

Specifically, on the bovine that has developed BRDC, symptoms, such as decreased appetite, coughing, nasal discharge, and high fever appear, and thus, by a combination of these factors, it is judged that BRDC has been developed. Additionally, symptoms of the severe BRDC become more severe than at the onset of BRDC, and symptoms, such as weakness, coughing, breathing difficulty, and extreme suppression of weight gain, appear. Therefore, by a combination of these factors, it is judged that the BRDC bovine has become severe. The judged result of whether each of the experimental bovines has developed BRDC and the judged result of whether each of BRDC bovines has become severe are input into the learning device 111 in association with the experimental data.

In step S504, the learning device 111 generates training data (which will be described below in detail with reference to FIG. 8A and FIG. 8B) by using the experimental data and the judged result, and performs an analysis. The learning device 111, for example, performs machine learning on the learning model by using the training data to analyze the training data.

In step S505, the learning device 111 generates a learned model by analyzing the training data.

In step S506, in the detecting device 110, the learned model generated by the learning device 111 is installed. In response to completing the installation of the learned model in the detecting device 110, the BRDC sign detecting system 100 transitions to the sign detection and learning phase.

Upon moving to the sign detection and learning phase, in step S511, each of the bovines is first transferred from the pasture 180 to the feedlot 140.

In step S512, the fattener manager of the feedlot 140 checks a condition of each of the bovines transferred from the pasture 180.

In step S513, the detecting device 110 starts collecting feedlot data by starting to monitor each of the bovines in the feedlot 140.

In step S514, the fattener manager of the feedlot 140 starts the fattening process for each of the bovines whose conditions are well.

In step S515, the detecting device 110 uses the current feedlot data to detect a sign of the BRDC development for each of the bovines for which the fattening process has been started in the feedlot 140.

In step S516, the fattener manager of the feedlot 140 performs the isolation treatment or the medication treatment on a bovine on which a sign of the BRDC development is detected.

In step S517, in the feedlot 140, the fattening process is terminated when the time required for the fattening process has elapsed.

In step S518, the fattener manager of the feedlot 140 judges a condition of each of the bovines. The detecting device 110 generates training data (which will be described below in detail with reference to FIG. 12) by using results judged by the fattening manager of the feedlot 140 and sign detection data used to detect a sign (which will be described below in detail with reference to FIG. 10), and transmits the training data to the learning device 111.

In step S519, the learning device 111 again performs machine learning on the learning model by using the training data transmitted from the detecting device 110. This enables the learning device 111 to modify the learned model.

In step S520, in the detecting device 110, the learned model modified by the learning device 111 is installed. Upon completing the installation of the modified learned model, the BRDC sign detecting system 100 transitions to the sign detection phase.

Upon moving to the sign detection phase, in step S531, next bovines are transferred from the pasture 180 to the feedlot 140.

In step S532, the fattener manager of the feedlot 140 checks a condition of each of the next bovines transferred from the pasture 180.

In step S533, the detecting device 110 starts to collect the feedlot data by starting to monitor each of the bovines on the feedlot 140.

In step S534, the fattener manager of the feedlot 140 starts the fattening process for each of the bovines whose conditions are well based on a result of the check.

In step S535, the detecting device 110 detects a sign of the BRDC development for each of the bovines for which the fattening process has been started in the feedlot 140 by using the sign detection data generated based on the current feedlot data.

In step S536, the fattener manager of the feedlot 140 performs the isolation treatment or the medication treatment on the bovine for which a sign of the BRDC development is detected.

In step S537, in the feedlot 140, the fattening process is terminated when the time required for the fattening process has elapsed.

<Functional Configurations of the Learning Device and the Detecting Device>

Figure 6:
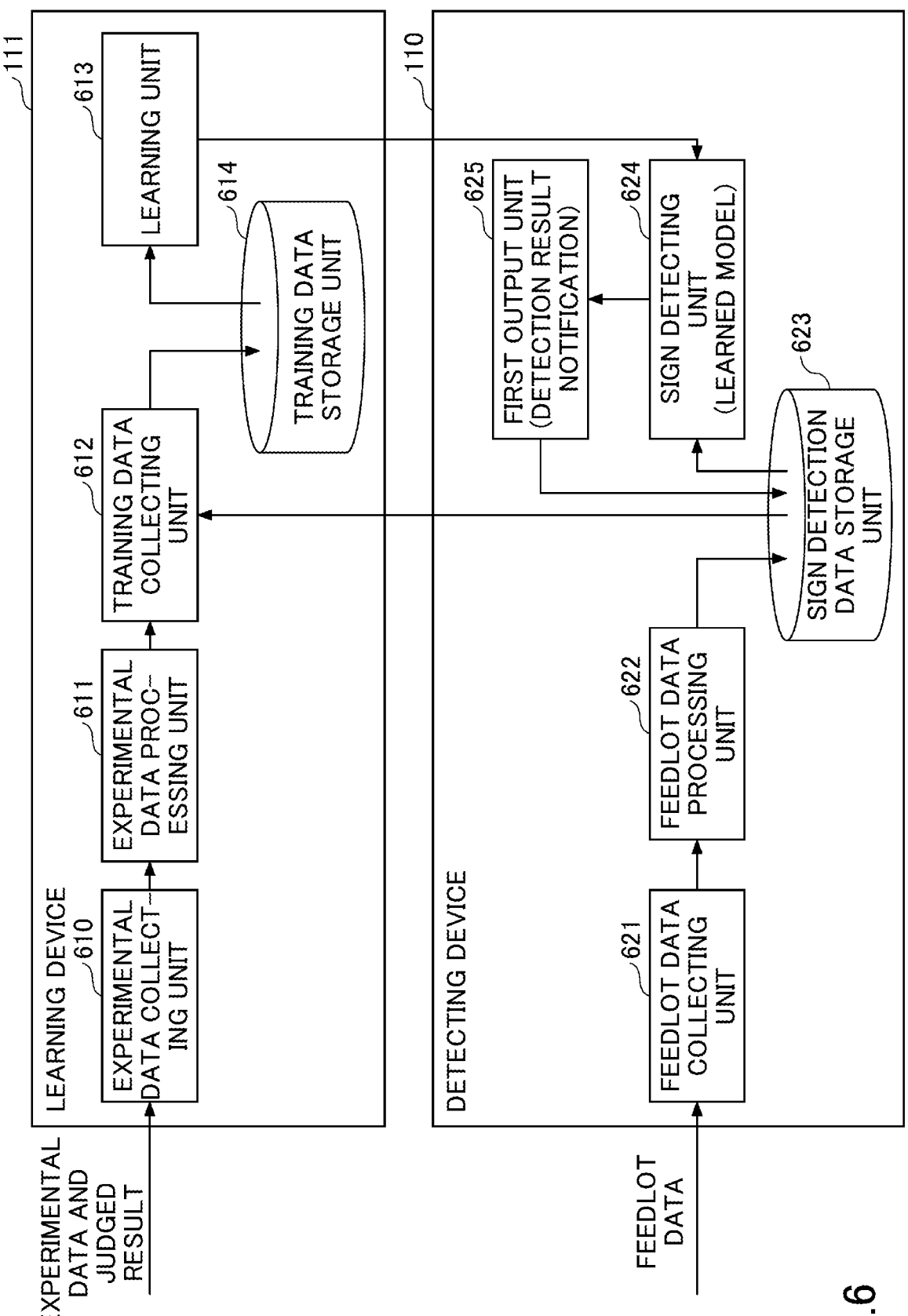
FIG. 6 is a first drawing illustrating an example of functional configurations of a learning device and the detecting device.

Next, functional configurations of the learning device 111 and the detecting device 110 will be described. FIG. 6 is a first drawing illustrating an example of functional configurations of the learning device and the detecting device.

A learning program is installed in the learning device 111 and, by executing the program, the learning device 111 functions as an experimental data collecting unit 610, an experimental data processing unit 611, a training data collecting unit 612, and a learning unit 613.

The experimental data collecting unit 610 collects image data and measurement data transmitted from the experimental field 112 as experimental data. Additionally, the experimental data collecting unit 610 obtains a judged result of whether the experimental bovine has developed BRDC and a judged result of whether the experimental BRDC bovine has become severe (information indicating whether BRDC has been developed) in association with the experimental data.

The experimental data processing unit 611 is an example of a processing unit, and extracts a feature from the collected experimental data and analyze the extracted feature to generate training data for each individual bovine.

The training data collecting unit 612 is an example of an obtaining unit. In the learning phase, the training data collecting unit 612 stores training data (including corresponding judged results) generated in the experimental data processing unit 611, in the training data storage unit 614.

In the sign detection and learning phase, the training data collecting unit 612 stores training data (including corresponding judged results) generated in the detecting device 110, in the training data storage unit 614.

In the learning phase, the learning unit 613 performs machine learning on the learning model by using, for example, the training data stored in the training data storage unit 614 to generate the learned model. The generated learned model is provided to the detecting device 110 and installed in a sign detecting unit 624.

Additionally, in the sign detection and learning phase, the learning unit 613 again performs machine learning on the learning model by using the training data newly stored in the training data storage unit 614 to modify the learned model. The modified learned model is again provided to the detecting device 110 and installed in the sign detecting unit 624.

With respect to the above, the sign detection program is installed in the detecting device 110. By executing the program, the detecting device 110 functions as a feedlot data collecting unit 621, a feedlot data processing unit 622, a sign detecting unit 624, and a first output unit 625.

The feedlot data collecting unit 621 collects the image data and measurement data transmitted from the feedlot 140 as the feedlot data.

The feedlot data processing unit 622 is an example of a processing unit. The feedlot data processing unit 622 extracts a feature from the collected feedlot data and analyzes the extracted feature to generate sign detection data for each individual bovine, and stores the sign detection data in a sign detection data storage unit 623.

The sign detecting unit 624 includes, for example, the learned model provided by the learning unit 613. The sign detecting unit 624 executes the learned model by using the sign detection data read from the sign detection data storage unit 623 to detect a sign of the BRDC development.

If the sign detecting unit 624 detects a sign of the BRDC development, the sign detecting unit 624 notifies the first output unit 625.

If the first output unit 625 is notified by the sign detecting unit 624 of the detection of a sign of the BRDC development, the first output unit 625 outputs information that identifies the bovine, and notifies the administrator of the detecting device 110 of the bovine on which a sign of the BRDC development has been detected.

Although not explicitly illustrated in FIG. 6, it is assumed that the detecting device 110 has a function to generate training data (which will be described below in detail with reference to FIG. 12) by using the following data.

the sign detection data stored in the sign detection data storage unit 623 the results judged by the fattening manager of the feedlot 140

<Details of Each Unit of the Learning Device>

Next, each unit of the learning device 111 (here, the experimental data processing unit 611 and the learning unit 613) will be described in detail.

(1) Details of the Experimental Data Processing Unit

First, the experimental data processing unit 611 of the learning device 111 will be described in detail. FIG. 7 is a drawing illustrating the experimental data processing unit in detail. As illustrated in FIG. 7, the experimental data processing unit 611 includes a feature extracting unit 710, an action data analyzing unit 720, a non-action data analyzing unit 730, and a vital data analyzing unit 740.

The feature extracting unit 710 extracts a feature from image data (i.e., image data 1 to image data n) included in the experimental data. Additionally, the feature extracting unit 710 extracts a feature from the measurement data (i.e., the first acceleration data, the second acceleration data, the temperature data, and the sound data) included in the experimental data.

The features extracted by the feature extracting unit 710 include various features. Examples include the position coordinates that indicate the positions of the foots of each of the bovines. By calculating the feature, for example, the walking distance (or the number of steps taken while walking), the running distance (or the number of steps taken while running), and the like can be calculated by analyzing "walking" (or "running"), which is one of the items of the action data of the bovine.

The action data analyzing unit 720 generates action data 750 by analyzing the feature extracted in the feature extracting unit 710. As illustrated in FIG. 7, the action data 750 generated by the action data analyzing unit 720 includes, for example, the number of times eating per day, the walking distance per day (or the number of steps taken while walking), and the running distance per day (or the number of steps taken while running).

The action data 750 generated by the action data analyzing unit 720 includes, for example, the number of times (or hours) of standing at rest per day, the number (or hours) of chewing in standing per day, the number (or hours) of lying at rest per day, and the number (or hours) of chewing in lying per day.

Further, the action data 750 generated by the action data analyzing unit 720 includes, for example, the amount (or number) of drinking water per day, the amount (or number) of licking salt per day, the presence or absence of estrus, and the like.

The non-action data analyzing unit 730 generates non-action data 760 by analyzing the feature extracted in the feature extracting unit 710. As illustrated in FIG. 7, the non-action data 760 generated by the non-action data analyzing unit 730 includes, for example, the degree of inactivity. The degree of inactivity is an indicator of the degree indicating how much movements of the bovine are decreased from original movements.

The vital data analyzing unit 740 generates vital data 770 by analyzing the feature extracted in the feature extracting unit 710. As illustrated in FIG. 7, the vital data 770 generated by the vital data analyzing unit 740 includes, for example, the volume of the lung sound per unit time, the body temperature per unit time, and the respiratory rate per unit time.

The vital data 770 generated by the vital data analyzing unit 740 includes, for example, the presence or absence of nasal discharge, body weight, and the like.

The experimental data processing unit 611 of the learning device 111 generates the training data by using the action data 750, the non-action data 760, and the vital data 770 (i.e., data indicating conditions of the bovine) and stores the training data in the training data storage unit 614.

Figure 8A:
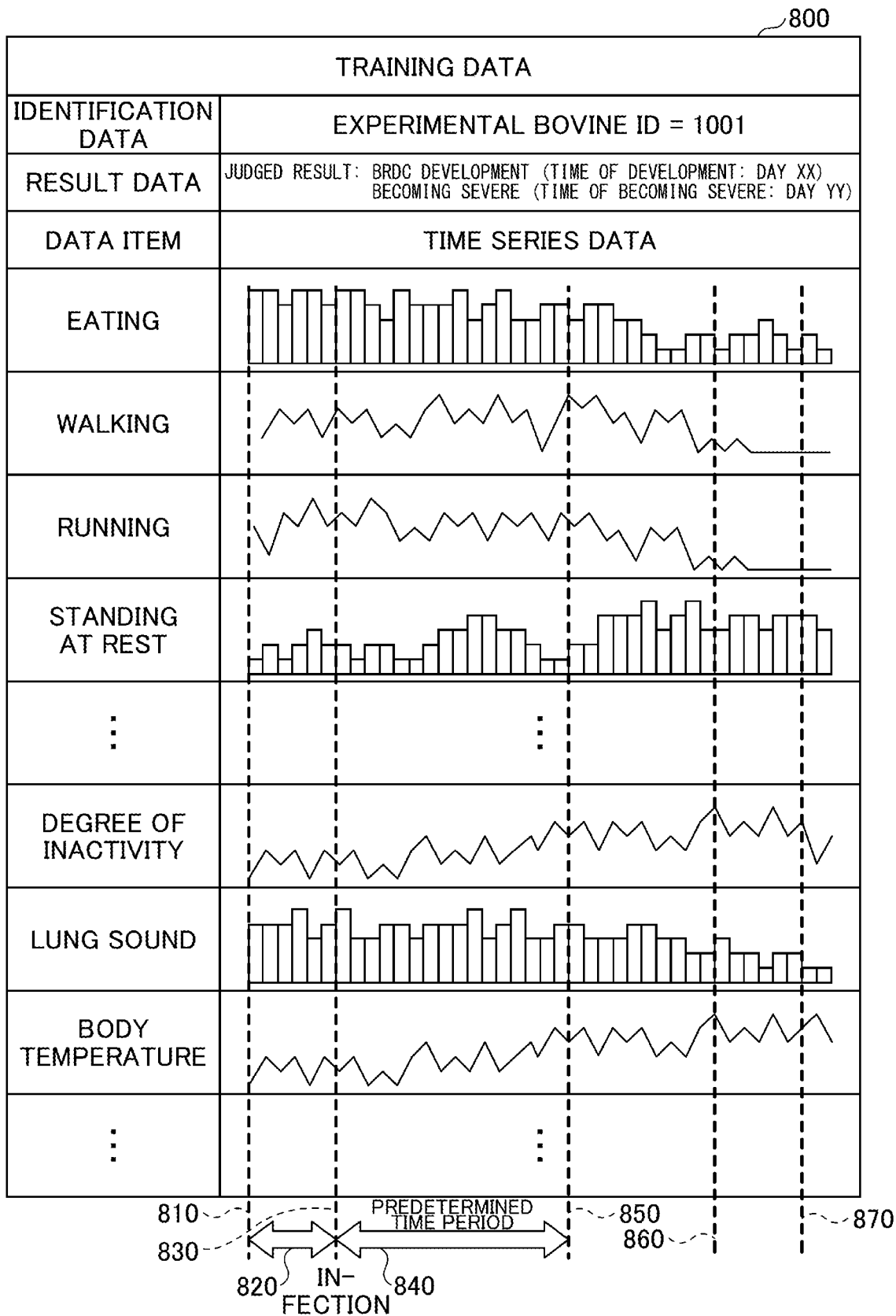
FIG. 8A is a first drawing illustrating an example of training data stored in a training data storage unit.
Figure 8B:
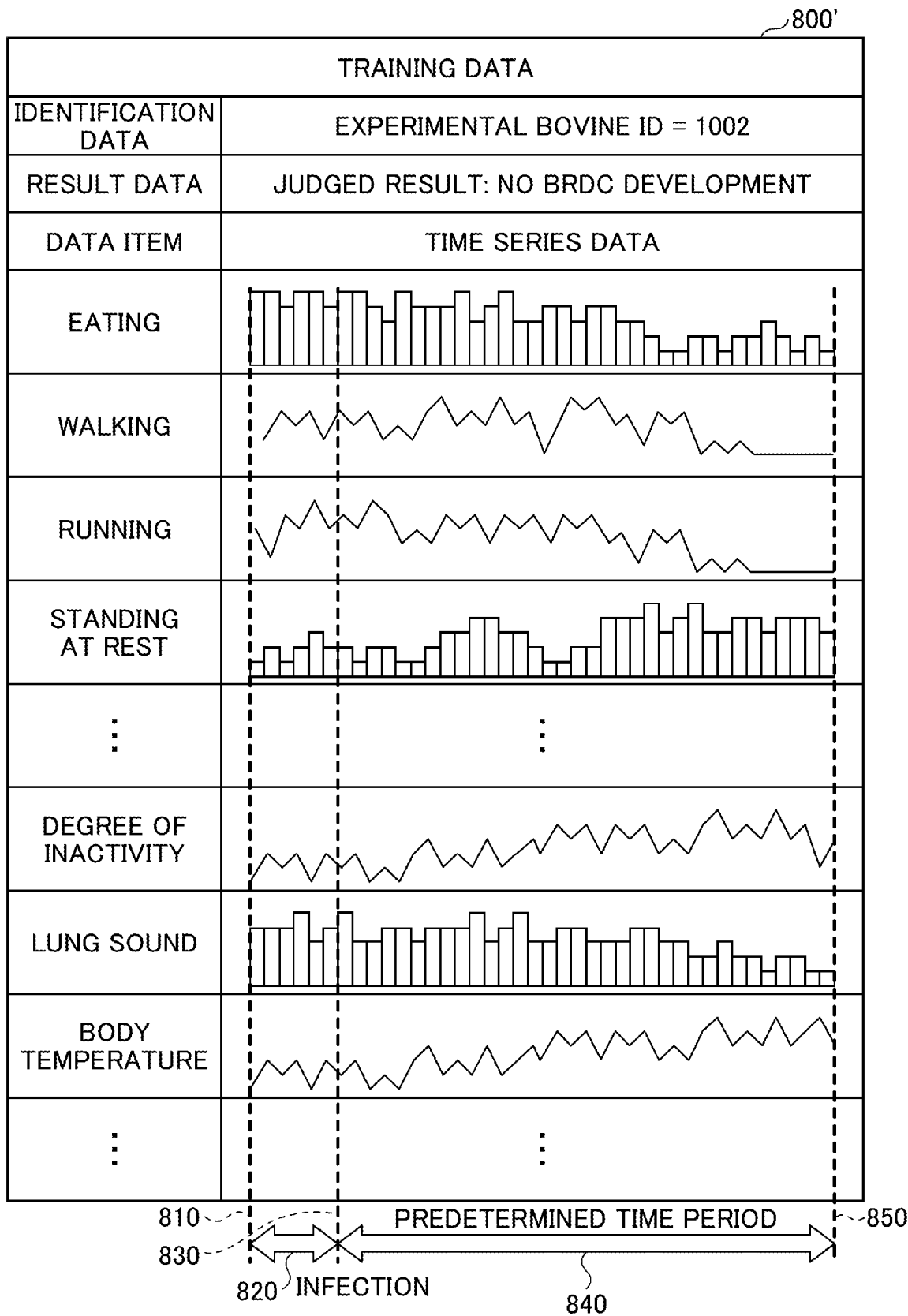
FIG. 8B is a second drawing illustrating an example of the training data stored in the training data storage unit.

FIG. 8A and FIG. 8B are first and second drawings illustrating an example of the training data stored in the training data storage unit. As illustrated in FIG. 8A and FIG. 8B, the training data 800 includes "identification data" and "result data" as items of header information.

The example in FIG. 8A indicates that the experimental bovine ID="1001" is assigned as the identification data. The example of FIG. 8B indicates that the experimental bovine ID="1002" is assigned as the identification data.

The example in FIG. 8A also indicates that "judged result: having developed BRDC (period of development: day xx) and becoming severe (period of becoming severe: day yy)" is recorded as the result data. The example of FIG. 8B indicates that "judged result: no BRDC development" is recorded as the result data. As described, in the training data storage unit 614, both training data 800 related to the bovine that has developed BRDC and the training data 800' related to the bovine that has not developed BRDC are stored.

As illustrated in FIG. 8A and FIG. 8B, the training data 800 includes "data items" and "time series data" as items of body information.

The "data items" store respective data items of action data 750, non-action data 760, and vital data 770 generated by the experimental data processing unit 611.

The "time series data" stores time series data of data items included in the action data 750, the non-action data 760, and the vital data 770 generated by the experimental data processing unit 611.

In FIG. 8A and FIG. 8B, a dashed line 810 illustrated over the "time series data" indicates the timing when each of the experimental bovines having the experimental bovine ID="1001" and "1002" is transferred to the experimental field 112. In FIG. 8A and FIG. 8B, a dashed line 830 illustrated over the "time series data" indicates the timing of infecting each of the experimental bovines having the experimental bovine ID="1001" and "1002" with BRDC by administering a virus or bacterium causing BRDC to the experimental bovine. Thus, the time period indicated by the arrow 820 can be defined as a time period during which the experimental bovines having the experimental bovine ID="1001" and "1002" are healthy (i.e., in a state of being not infected with BRDC) in the experimental field 112.

In FIG. 8A, a dashed line 850 illustrated over the "time series data" indicates the timing when a predetermined time period (see the arrow 840) has elapsed from the timing of being infected with BRDC. Here, the predetermined time period refers to a period shorter than the period until the experimental bovine having the experimental bovine ID="1001" is finally judged to have developed BRDC and become severe. In a case of the bovine that has developed BRDC, the learning unit 613, which will be described later, uses the time series data within the predetermined period of time, which is indicated by the arrow 840, among the time series data, in generating a learned model.

As described, the time series data before BRDC is developed is used because there are concerns that if the time series data after the BRDC development was used, the accuracy of detecting a sign the BRDC development before BRDC has been developed would be reduced. In other words, by using time series data before BRDC has been developed, the accuracy of detecting a sign of the BRDC development can be improved.

In FIG. 8B, a dashed line 850 illustrated over the "time series data" indicates the timing when a predetermined time period (see the arrow 840) has elapsed from the timing of being infected with BRDC. Here, the predetermined time period refers to a period until the experimental bovine having the experimental bovine ID="1002" completes the fattening process without developing BRDC and completes the acquisition of the time-series data. In a case of the bovine that has not developed BRDC as of the end of the fattening process, the learning unit 613, which will be described later, uses the time series data within the predetermined time period indicated by the arrow 840 among the time series data in generating a learned model.

Further, a dashed line 860 illustrated over the "time series data" in FIG. 8A indicates the timing when it is judged that the experimental bovine having the experimental bovine ID="1001" has developed BRDC.

Further, a dashed line 870 illustrated over the "time series data" in FIG. 8A indicates the timing when it is judged that the experimental bovine having the experimental bovine ID="1001" has become severe.

In FIG. 8A and FIG. 8B, the training data stored in the training data storage unit 614 in the learning phase is illustrated. It is assumed that the training data stored in the training data storage unit 614 in the sign detection and learning phase has the same configuration.

(2) Details of the Learning Unit

Next, the learning unit 613 of the learning device 111 will be described in detail. FIG. 9 is a first drawing illustrating the learning unit in detail. The learning unit 613 generates a learned model to be installed in the sign detecting unit 624.

As illustrated in FIG. 9, the learning unit 613 includes a learning model 901 and a comparing modifying unit 902.

The learning model 901 is an example of a machine learning unit, for example, a convolutional neural network (CNN) based learning model. The learning model 901 performs a process in response to the time series data (for the predetermined time period) of the training data (e.g., the training data 800 and 800') read from the training data storage unit 614 being input. Then, the learning model 901 outputs an output result (the BRDC development, the time of the BRDC development, becoming severe, the time of becoming severe, or no BRDC development) to the comparing modifying unit 902.

The comparing modifying unit 902 calculates the error for the learning model 901 to perform machine learning. Specifically, the comparing modifying unit 902 calculates the error by comparing the following results.

an output result output from the learning model 901 (the BRDC development, the time of the BRDC development, becoming severe, the time of becoming severe, or no BRDC development)

a judged result included in a "result data" item of the training data read from the training data storage unit 614 (the BRDC development, the time of the BRDC development, becoming severe, the time of becoming severe, or no BRDC development).

The comparing modifying unit 902 performs machine learning on the learning model 901 by changing model parameters in the learning model 901 based on the calculated error.

The learning unit 613 illustrated in FIG. 9 generates a learned model by using the training data for all experimental bovines, stored in the training data storage unit 614, to perform machine learning on the learning model 901.

In the examples of the training data 800 and 800', the description assumes that the judged results include the BRDC development, the time of the BRDC development, becoming severe, the time of becoming severe, or no BRDC development. However, only one or more of these may be included in the judged results.

<Details of Each Unit of the Detecting Device>

Next, the respective units of the detecting device 110 (here, the feedlot data processing unit 622, the sign detecting unit 624, and the first output unit 625) will be described in detail.

(1) Details of the Feedlot Data Processing Unit

First, the feedlot data processing unit 622 of the detecting device 110 will be described in detail. The processing contents of the feedlot data processing unit 622 are substantially the same as the processing contents of the experimental data processing unit 611 of the learning device 111. Thus, sign detection data that is output from the feedlot data processing unit 622 and that is stored in the sign detection data storage unit 623 will be described here.

Figure 10:
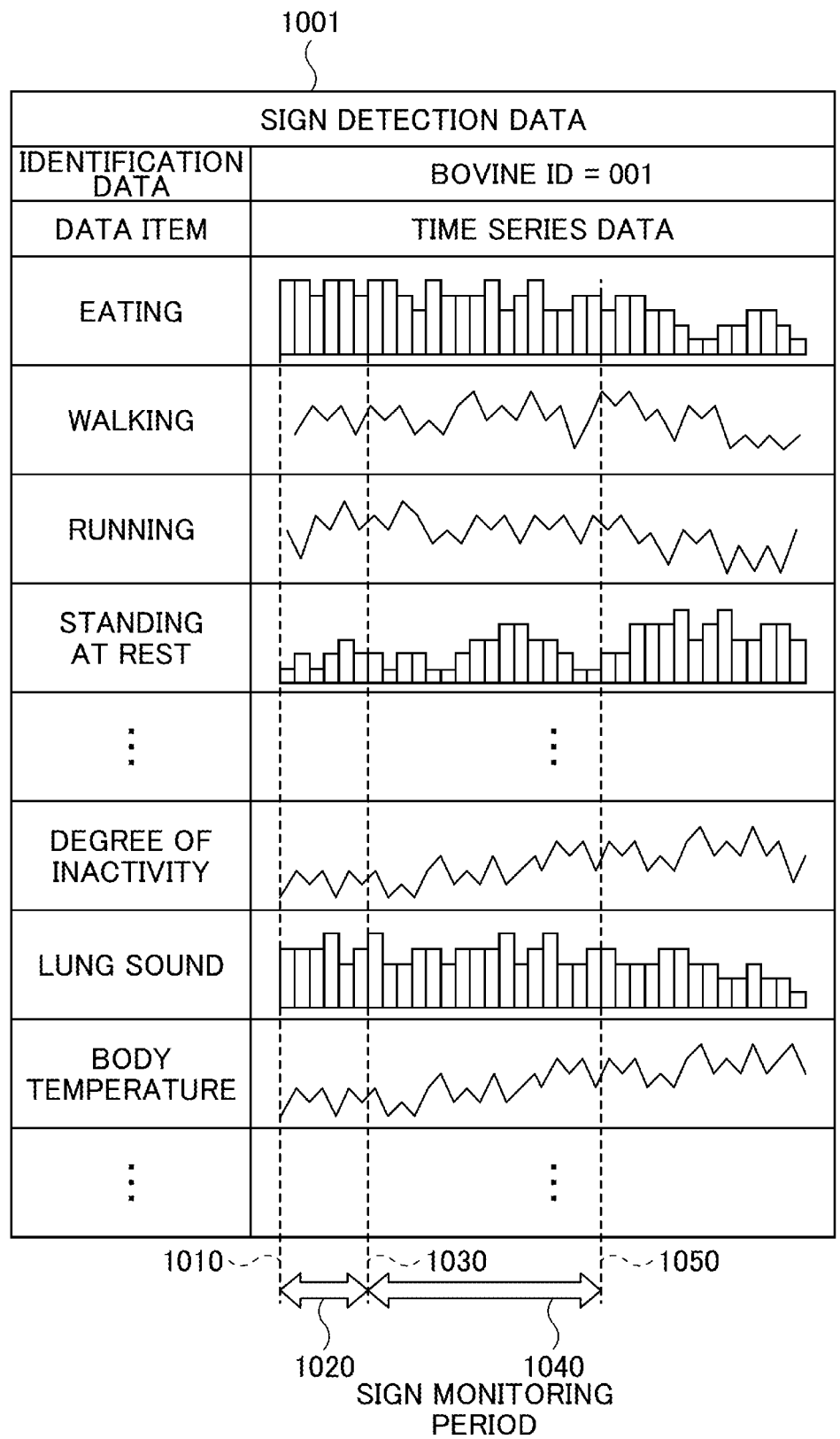
FIG. 10 is a first drawing illustrating an example of sign detection data stored in a sign detection data storage unit.

FIG. 10 is a first drawing illustrating an example of the sign detection data stored in the sign detection data storage unit. As illustrated in FIG. 10, the sign detection data 1001 includes "identification data" as an item of the header information.

The example of FIG. 10 indicates that the bovine ID="001" is assigned as the identification data.

As illustrated in FIG. 10, the sign detection data 1001 includes "data items" and "time series data" as items of the main body information.

The "data items" store respective data items of the action data, the non-action data, and the vital data output from the feedlot data processing unit 622.

The "time series data" stores the time series data of respective data items included in the action data, the non-action data, and the vital data output from the feedlot data processing unit 622.

Here, a dashed line 1010 illustrated over the "time series data" in FIG. 10 indicates the timing when the bovine having the bovine ID="001" is transferred to the feedlot 140 and a state check is started. A dashed line 1030 illustrated over the "time series data" in FIG. 10 indicates the timing when the state check of the bovine is completed. Thus, the arrow 1020 can be considered as the period in which the bovine having the bovine ID="001" is healthy (i.e., in a state of being not infected with BRDC).

A dashed line 1050 illustrated over the "time series data" in FIG. 10 indicates the timing when a predetermined time period (the arrow 1040) has elapsed since the fattening process has been started in the feedlot 140. Here, the predetermined time period indicated by the arrow 1040 of FIG. 10 is approximately the same length as the predetermined time period indicated by the arrow 840 of FIG. 8A. In the sign detection and learning phase, and the sign detection phase, the predetermined time period (the arrow 1040) is referred to as the sign monitoring period, and the time series data within the sign monitoring period is referred to as the sign monitoring data.

(2) Details of the Sign Detecting Unit

Figure 11:
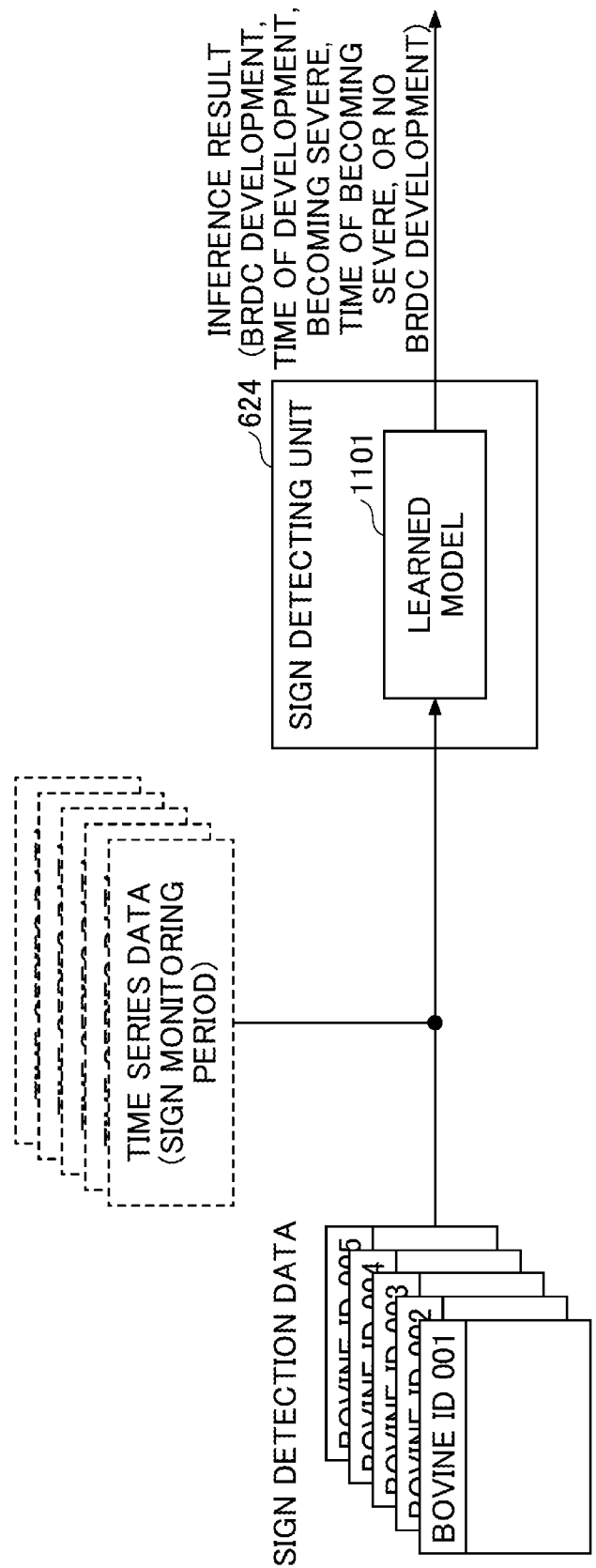
FIG. 11 is a first drawing illustrating a sign detecting unit in detail.

Next, a sign detecting unit 624 of the detecting device 110 will be described in detail. FIG. 11 is a first drawing illustrating the sign detecting unit in detail. As illustrated in FIG. 11, the sign detecting unit 624 includes a learned model 1101.

The learned model 1101 is an example of an inference unit and is generated by the learning unit 613. The learned model 1101 infers information indicating whether BRDC will be developed and outputs an inference result in response to time series data (for the sign monitoring period) of the sign detection data (e.g., the sign detection data 1001) read from the sign detection data storage unit 623 being input.

The information indicating whether BRDC will be developed includes information indicating that BRDC will be developed or information indicating that BRDC will not be developed, and either of these is output. The output of information indicating that BRDC will be developed refers to, for example, the output of a node including the "BRDC development" or the "BRDC development and becoming severe" in the output layer of the CNN constituting the learning model 901 of FIG. 9 as a result of inference. The output of information indicating that BRDC will not developed refers to, for example, the output of a node including "no BRDC" in the output layer of the CNN of FIG. 9 as a result of inference.

Into the learned model 1101, the time series data of the sign detection data is input every predetermined time period (e.g., every 3 hours). This allows the learned model 1101 to infer information indicating whether BRDC will be developed every predetermined period to output an inference result. That is, in the first embodiment, "detecting a sign of the BRDC development" or "notifying that a sign of the BRDC development is detected" is nothing else other than that the outputting, by the learned model 1101, of information indicating that BRDC will be developed as a result of inference.

In the sign detection and learning phase, the detecting device 110 generates the training data by using the sign detection data used to detect a sign and the judged results judged by the fattener manager after the fattening process is completed, and transmits the training data to the training data collecting unit 612. This allows the training data generated in the detecting device 110 to be stored in the training data storage unit 614.

FIG. 12 is a third drawing illustrating an example of the training data stored in the training data storage unit. As illustrated in FIG. 12, the sign detection data 1001 is associated with a result data 1201 of the corresponding bovine (bovine ID=001) and training data is generated for each individual bovine.

The example of FIG. 12 indicates that the result data 1201, in which "the judged result: the BRDC development (time of the development: day XX) and becoming severe (time of becoming severe: day YY)" is written, is associated with the sign detection data 1001.

(3) Details of the First Output Unit

Figure 13:
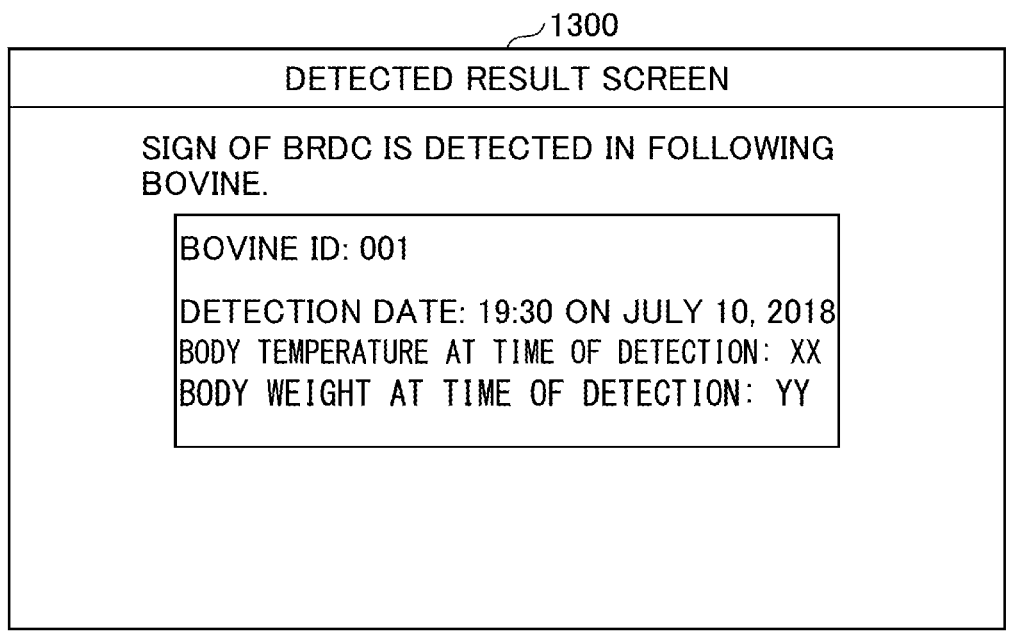
FIG. 13 is a drawing illustrating an example of a detected result screen.

Next, as processing details of the first output unit 625 of the detecting device 110, a detected result screen, which is an example of a display screen generated by the first output unit 625, will be described. FIG. 13 is a drawing illustrating an example of the detected result screen.

The first output unit 625 generates and displays a detected result screen 1300 on the display device 406 in response to being notified by the sign detecting unit 624 that a sign of the BRDC development has been detected.

As illustrated in FIG. 13, the detected result screen 1300 includes a message indicating that a sign of the BRDC development has been detected. Additionally, the detected result screen 1300 includes the bovine ID that identifies the bovine on which a sign of the BRDC development has been detected. Furthermore, the detected result screen 1300 includes the date and time when a sign of the BRDC development has been detected, the body temperature and the body weight of the bovine at the time of the detection, and the like.

Although not explicitly illustrated in FIG. 13, the detected result screen 1300 may include the current position of the bovine on which a sign of the BRDC development has been detected.

<Effect of the BRDC Sign Detecting System>

Next, the effect of the BRDC sign detecting system 100 will be described. As described above, the BRDC sign detecting system 100 can detect a sign before BRDC is developed. As a result, losses associated with disposal of the bovines can be reduced. This is because detection and treatment at an early stage before the development or becoming severe can reduce the absolute amount of the bovine that has become severe.

Additionally, the increase in fattening costs due to the delay in shipment can be suppressed. This is because detection and treatment at an early stage before the development or becoming severe can shorten a time period until the bovine losing weight is recovered.

Further, treatment costs can be reduced. This is because detection and treatment at an early stage before the development or becoming severe can reduce the number of medications and reduce the cost of treatment in comparison with a case of the treatment of bovine after the development or becoming severe. This is also because a bovine that can recover spontaneously even if the bovine has developed BRDC can be identified before medication.

<Summary>

As is obvious from the above description, the BRDC sign detecting system 100 according to the first embodiment performs the following processes.

- obtain, with respect to a bovine developing BRDC within a period required for a fattening process, data indicating a condition of the bovine during a predetermined period in which the bovine did not yet develop the BRDC (time series data for each data item), and obtain data indicating a condition, during a predetermined period, of the bovine that has not developed BRDC as of an end of the period of time required for the fattening process (time series data for each data item)
- perform machine learning with respect to a correspondence relation between the obtained data indicating the condition during the predetermined period and the information indicating whether BRDC has been developed
- infer, by inputting data indicating the condition of a new bovine during the predetermined time period into the learned model generated by performing machine learning with respect to the correspondence relationship, information indicating whether the new bovine will develop BRDC and output an inference result Thus, according to the first embodiment, a sign of the BRDC development can be detected at an early stage in which BRDC is not developed.

Second Embodiment

In the first embodiment described above, the description assumes that the time series data is input into the learning model 901. However, data input into the learning model 901 is not limited to the time series data.

For example, instead of the time series data, processed data generated by processing the time series data may be input. In a second embodiment, as the processed data, the change amount of the time series data from a reference data is calculated and the change amount is input to the learning model 901.

In addition to the time series data, data other than the time series data may be input. In the second embodiment, as the data other than the time series data, previous data (data related to the breeding before the experimental bovine is transferred to the experimental field 112) is obtained and the previous data is input into the learning model 901.

In the following, the second embodiment will be described in detail focusing on the differences from the first embodiment described above.

<Functional Configurations of the Learning Device and the Detecting Device>

Figure 14:
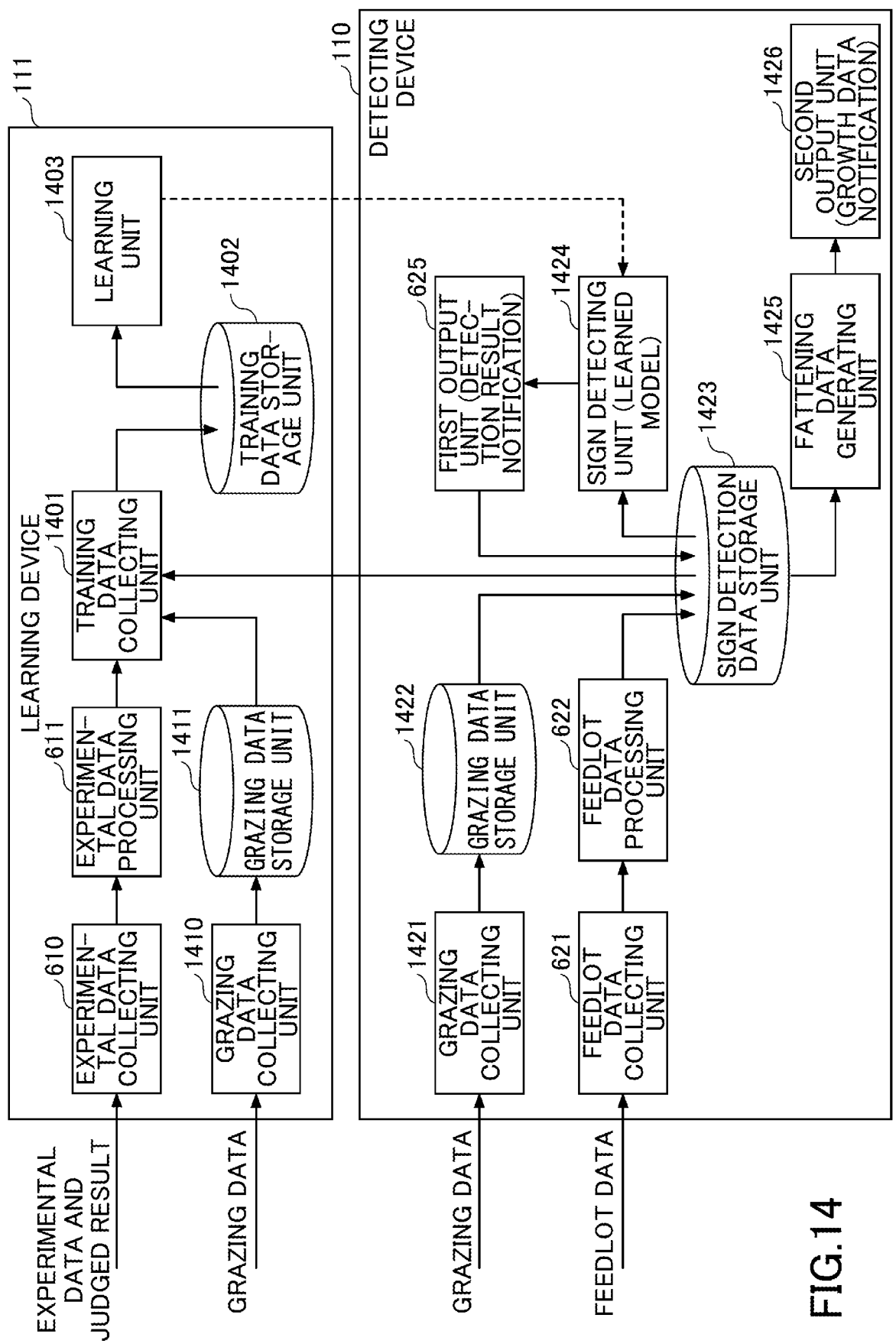
FIG. 14 is a second drawing illustrating an example of the functional configurations of the learning device and the detecting device.

First, functional configurations of the learning device 111 and the detecting device 110 will be described. FIG. 14 is a second drawing illustrating an example of the functional configurations of the learning device and the detecting device.

A difference from FIG. 6 is that the learning device 111 of FIG. 14 also functions as a grazing data collecting unit 1410. Additionally, the difference is that in the learning device 111 of FIG. 14, the functions of the training data collecting unit 1401 and the learning unit 1403 are different from the functions of the training data collecting unit 612 and the learning unit 613 illustrated in FIG. 6.

A difference from FIG. 6 is that the detecting device 110 of FIG. 14 also functions as a grazing data collecting unit 1421, a fattening data generating unit 1425, and a second output unit 1426. Additionally, the difference is that in the detecting device 110 of FIG. 14, the function of the sign detecting unit 1424 is different from the function of the sign detecting unit 624 illustrated in FIG. 6.

In the learning device 111, the grazing data collecting unit 1410 collects the previous data (i.e., data related to the breeding before the experimental bovine is transferred to the experimental field 112) and stores the previous data in the training data collecting unit 1401. Here, in the present embodiment, the previous data refers to the grazing data (e.g., genetic information, past medical history, date of birth of the bovine, place of production, and the like) obtained by managing the bovine grass-fed in the pasture 180. The grazing data collecting unit 1410 collects the grazing data from the terminal device 181 through the network 120.

The training data collecting unit 1401 is an example of an obtaining unit. In the learning phase, the training data collecting unit 1401 stores the training data (including the corresponding judged results) generated in the experimental data processing unit 611 in a training data storage unit 1402. At this time, the training data collecting unit 1401 reads corresponding grazing data from the grazing data storage unit 1411 and stores the grazing data in the training data storage unit 1402, so as to be included in the training data.

In the sign detection and learning phase, the training data collecting unit 1401 stores training data (including the corresponding judged result and the corresponding grazing data) generated in the detecting device 110 in the training data storage unit 1402.

In the learning phase, the learning unit 1403 performs machine learning on the learning model by using, for example, the training data stored in the training data storage unit 1402 to generate a learned model. In the learning unit 1403, instead of the time series data, the change amount of the time series data from the reference data is input into the learning model 901. Additionally, in the learning unit 1403, the grazing data is input into the learning model 901 in addition to the time series data.

In the detecting device 110, similarly with the grazing data collecting unit 1410 of the learning device 111, the grazing data collecting unit 1421 collects the grazing data and stores the grazing data in the grazing data storage unit 1422. Among the grazing data stored in the grazing data storage unit 1422, the grazing data of the bovine for which the fattening process has been started in the feedlot 140 is stored in the sign detection data storage unit 1423 so as to be included in corresponding sign detection data.

The sign detecting unit 1424 includes, for example, the learned model provided by the learning unit 1403. The sign detecting unit 1424 executes the learned model by using the sign detection data read from the sign detection data storage unit 1423 and detects a sign of the BRDC development. In the sign detecting unit 1424, instead of the time series data, the change amount of the time series data from the reference data is input into the learned model. In the sign detecting unit 1424, in addition to the time series data, the grazing data is input into the learned model.

The fattening data generating unit 1425 reads the sign detection data (i.e., the sign detection data including the grazing data) from the sign detection data storage unit 1423 for the bovine transferred to the abattoir processor 183 upon the completion of the fattening process, and generates the fattening data.

The second output unit 1426 transmits the generated fattening data to the terminal device 184 of the abattoir processor 183. This allows the abattoir processor 183 to obtain the fattening data for the bovine transferred from feedlot 140 that has completed the fattening process.

<Details of the Training Data>

Figure 15A:
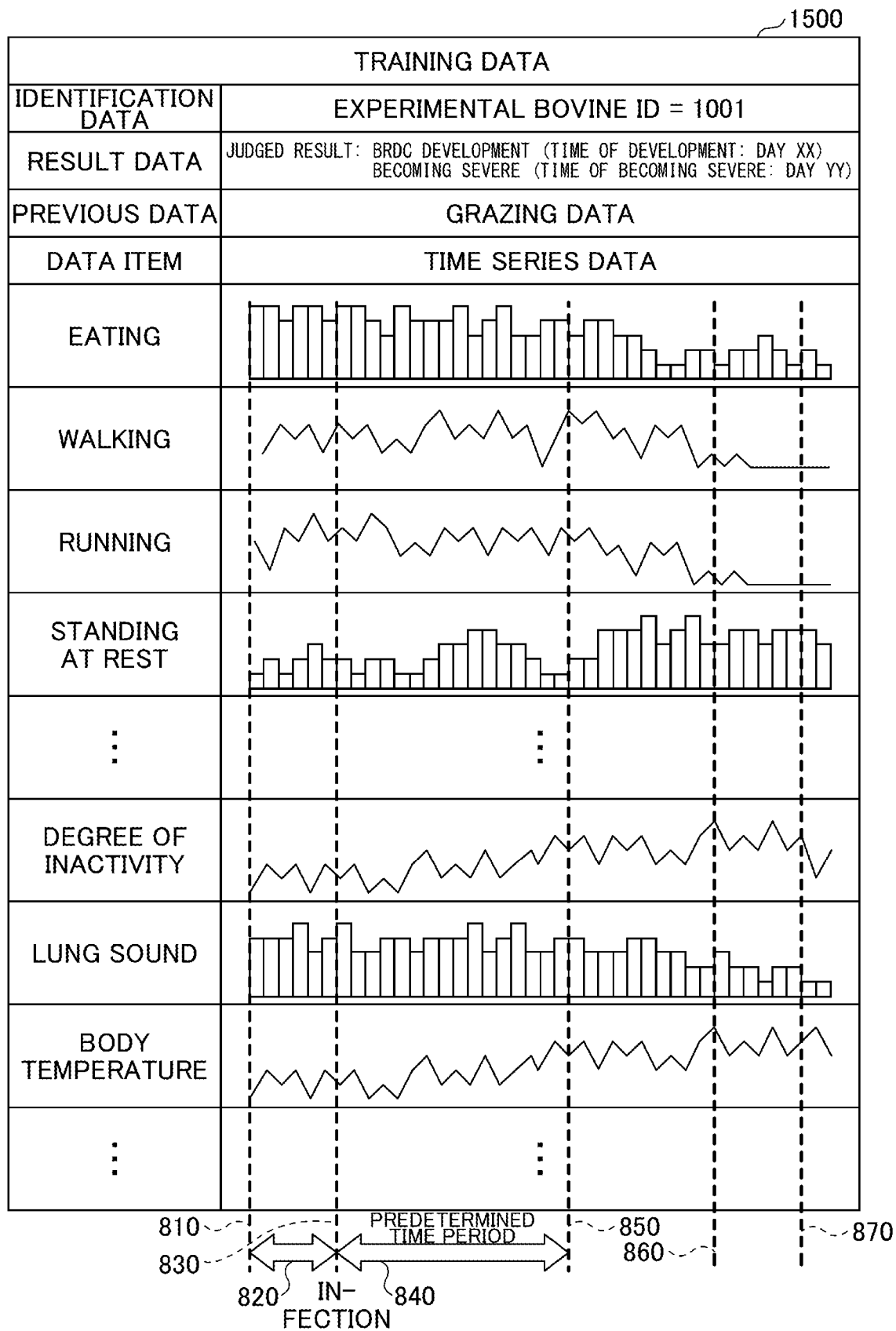
FIG. 15A is a fourth drawing illustrating an example of the training data stored in the training data storage unit.
Figure 15B:
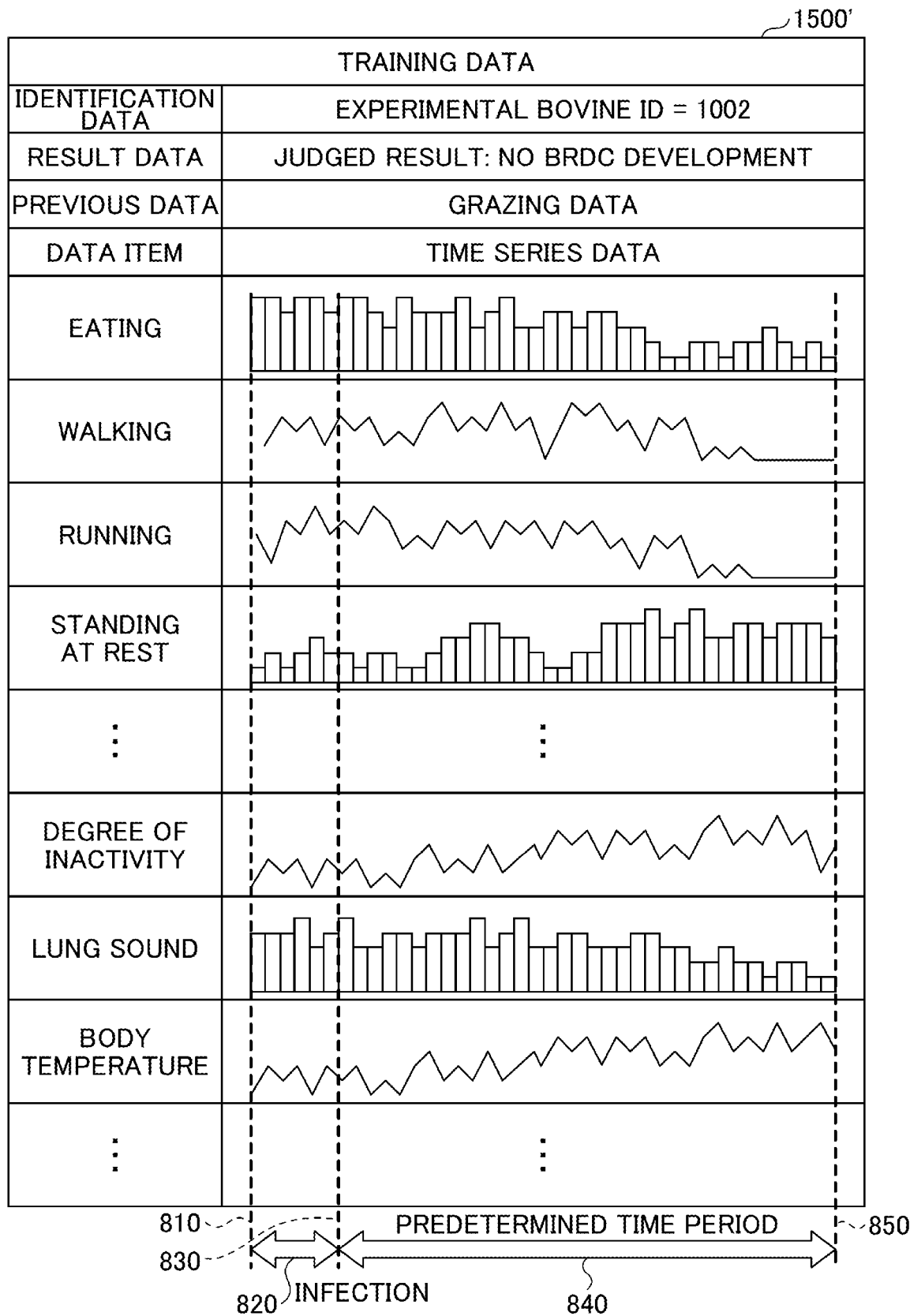
FIG. 15B is a fifth drawing illustrating an example of the training data stored in the training data storage unit.

Next, the training data stored in the training data storage unit 1402 will be described in detail. FIG. 15A and FIG. 15B are fourth and fifth drawings illustrating examples of the training data stored in the training data storage unit. A difference from the training data 800 and 800' illustrated in FIG. 8A and FIG. 8B is that in the training data 1500 and 1500', the "previous data" is included as an item of the header information. As illustrated in FIG. 15A and FIG. 15B, in the present embodiment, the grazing data is stored in the "previous data".

<Details of the Learning Unit>

Figure 16:
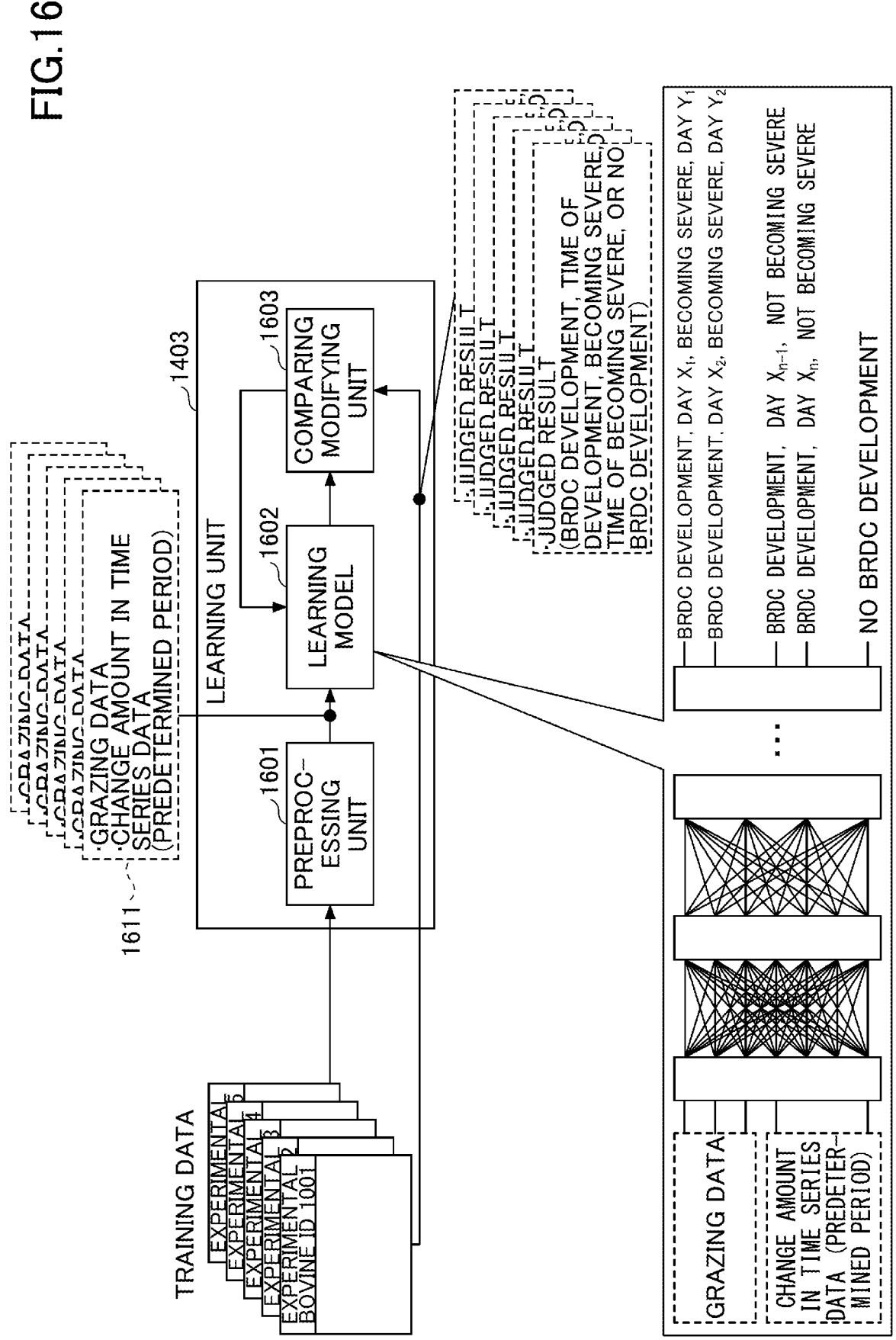
FIG. 16 is a second drawing illustrating the learning unit in detail.

Next, the learning unit 1403 of the learning device 111 will be described in detail. FIG. 16 is a second drawing illustrating the learning unit in detail. As illustrated in FIG. 16, the learning unit 1403 includes a preprocessing unit 1601, a learning model 1602, and a comparing modifying unit 1603.

The preprocessing unit 1601 generates data to be input into the learning model 1602 based on the training data. The data input into the learning model 1602 is as follows (see the reference numeral 1611).

the grazing data
the change amount of the time series data of each data item (for the predetermined time period)

Among these, the grazing data is extracted from the item of the "previous data" of the training data (e.g., the training data 1500 and 1500') read from the training data storage unit 1402.

The change amount of the time-series data of each data item (for the predetermined time period) is data representing the condition of the bovine and is calculated based on the time series data of the training data (e.g., the training data 1500 and 1500') read from the training data storage unit 1402. Specifically, for each data item (eating, walking, . . . , and the like), by calculating a difference of the following data, the change amount of the time series data is calculated.

the time series data within the predetermined time period as indicated by the arrow 840
the reference data (e.g., a representative value (e.g., the average value) of the time-series data within the predetermined time period as indicated by the arrow 820)

The learning model 1602 is an example of a machine learning unit, for example a convolutional neural network (CNN) based learning model. The learning model 1602 performs a process by inputting the data (i.e., the grazing data, the change amount of the time series data (for the predetermined time period)) generated by the preprocessing unit 1601. Then, the learning model 1602 outputs the output result (i.e., the BRDC development, the time of the development, becoming severe, the time of becoming severe, or no BRDC development) to the comparing modifying unit 1603.

The comparing modifying unit 1603 calculates the error for the learning model 1602 to perform machine learning. Specifically, the comparing modifying unit 1603 calculates the error by comparing the following data.

the output result (i.e., the BRDC development, the time of the development, becoming severe, the time of becoming severe, or no BRDC development) output from the learning model 1602
the judged result (i.e., the BRDC development, the time of the development, becoming severe, the time of becoming severe, or no BRDC development) included in the item of the "result data" in the training data read from the training data storage unit 1402 The comparing modifying unit 1603 performs machine learning on the learning model 1602 by changing model parameters in the learning model 1602 based on the calculated error.

In the learning unit 1403 illustrated in FIG. 16, a learned model is generated by performing machine learning on the learning model 1602 by using the training data for all experimental bovines stored in the training data storage unit 1402.

<Details of the Sign Detection Data>

Figure 17:
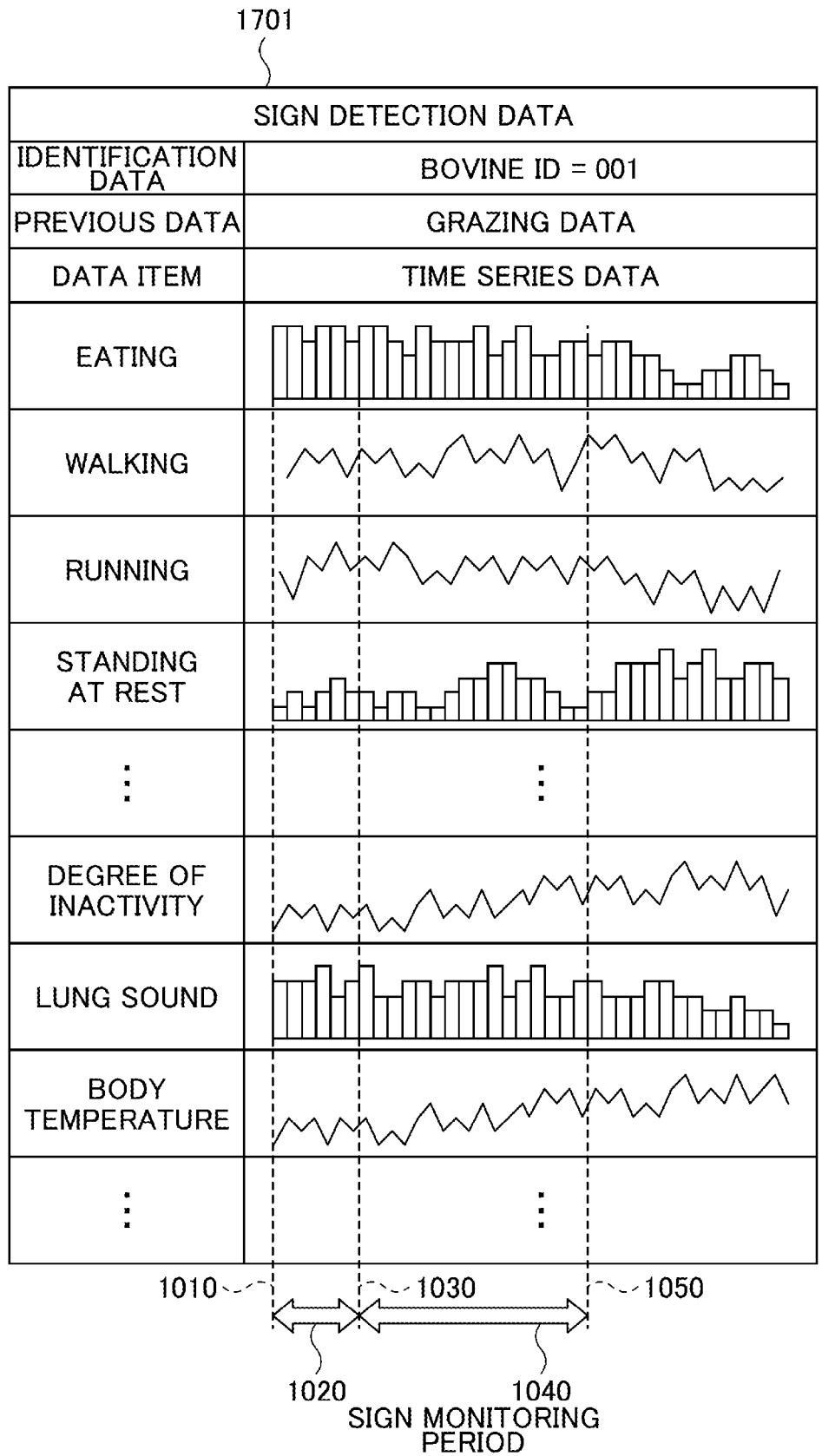
FIG. 17 is a second drawing illustrating an example of the sign detection data stored in the sign detection data storage unit.

Next, the sign detection data stored in the sign detection data storage unit 1423 will be described in detail. FIG. 17 is a second drawing illustrating an example of the sign detection data stored in the sign detection data storage unit. A difference from the sign detection data 1001 illustrated in FIG. 10 is that the "previous data" is included as an item of the header information. In the present embodiment, as illustrated in FIG. 17, the grazing data is stored in the "previous data".

<Details of the Sign Detecting Unit>

Figure 18:
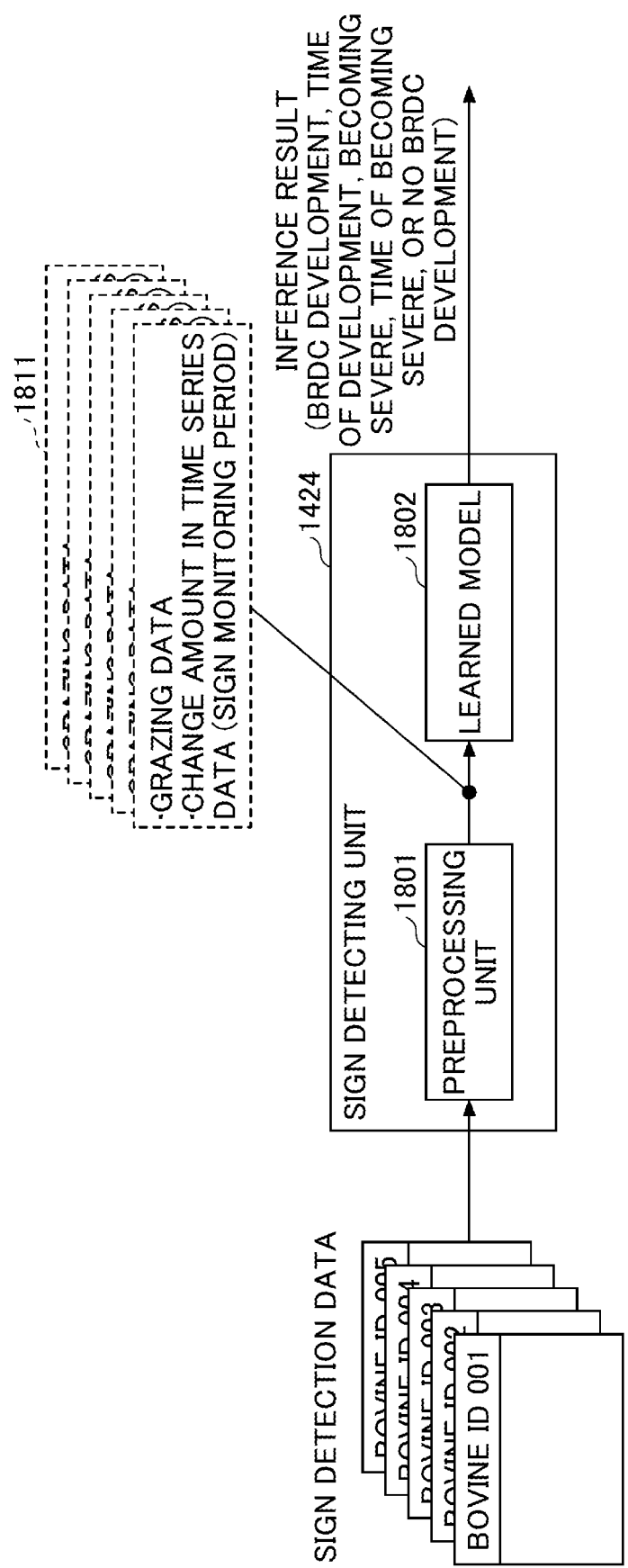
FIG. 18 is a second drawing illustrating the sign detecting unit in detail.

Next, the sign detecting unit 1424 of the detecting device 110 will be described in detail. FIG. 18 is a second drawing illustrating the sign detecting unit in detail. As illustrated in FIG. 18, the sign detecting unit 1424 includes a preprocessing unit 1801 and a learned model 1802.

The preprocessing unit 1801 generates data to be input to the learned model 1802 based on the sign detection data. The data to be input into the learned model 1802 is as follows (see the reference numeral 1811).

the grazing data
the change amount of the time series data of each data item (for the sign monitoring period)

Among these, the grazing data is extracted from the item of the "previous data" of the sign detection data (e.g., the sign detection data 1701) read from the sign detection data storage unit 1423.

The change amount of the time series data of each data item (for the sign monitoring period) is calculated based on the time series data of the sign detection data (e.g., the sign detection data 1701) read from the sign detection data storage unit 1423. Specifically, for each data item (eating, walking, . . . , and the like), by calculating a difference between the following data, the change amount in the time series data is calculated.

the time series data within the predetermined time period as indicated by the arrow 1040 the reference data (e.g., the representative value (e.g., the average value) of the time series data within the predetermined time period as indicated by the arrow 1020)

The learned model 1802 is an example of an inference unit and is generated by the learning unit 1403. The learned model 1802 performs the process in response to the data (i.e., the grazing data, the change amount in the time series data (for the sign monitoring period)) generated by the preprocessing unit 1801 being input. Then, the learned model 1802 infers information indicating whether BRDC will be developed and outputs an inference result.

In the sign detection and learning phase, the detecting device 110 generates the training data by using the sign detection data used to detect a sign and the judged result judged by the fattener manager after the fattening process is completed, and transmits the training data to the training data collecting unit 1401. This allows the training data generated in the detecting device 110 to be stored in the training data storage unit 1402.

FIG. 19 is a sixth drawing illustrating an example of the training data stored in the training data storage unit. As illustrated in FIG. 19, the training data is generated for each individual bovine by associating the sign detection data 1001 with the result data 1901 of the corresponding bovine (bovine ID=001).

<Summary>

As is obvious from the above description, the BRDC sign detecting system 100 according to the second embodiment performs the following processes.

obtain, with respect to a bovine developing BRDC within a period required for a fattening process, data indicating a condition of the bovine during a predetermined period in which the bovine did not yet develop the BRDC (i.e., the change amount of the time series data of each data item), and obtain data indicating a condition, during a predetermined period, of a bovine that has not developed BRDC as of an end of the time required for the fattening process (the change amount of the time series data of each data item)

obtain grazing data for each of the bovines perform machine learning with respect to a correspondence relation between the obtained data indicating the condition during the predetermined period and the grazing data, and information indicating whether BRDC is developed infer, by inputting data indicating a condition during the predetermined time period and grazing data of a new bovine into a learned model generated by performing machine learning with respect to the correspondence relationship, information indicating whether the new bovine will develop BRDC and output an inference result This can detect a sign of the BRDC development at an early stage in which BRDC is not developed according to the second embodiment.

Third Embodiment

In the above-described first and second embodiments, it has been described that the learning units 613 and 1403 include the learning models 901 and 1602, and the learned models are generated by performing machine learning using the training data. In the above-described first and second embodiments, it has been described that the sign detecting units 624 and 1424 execute the learned models by using the sign detection data and output the inference results.

With respect to the above, in a third embodiment, an individual data storage unit is provided in the learning units 613 and 1403, and the previous data and the time series data of each data item (or the change amount in the time series data of each data item) are stored for each individual bovine in association with the judged result. In the third embodiment, the sign detecting units 624 and 1424 contrast the following data and search for similar data.

the previous data and time series data of each data item (or the change amount in the time series data of each data item) newly obtained the previous data and the time series data of each data item (or the change amount in the time series data of each data item) accumulated in the past In the third embodiment, the sign detecting units 624 and 1424 output the judged result associated with the search result as the inference result. In the following, the third embodiment will be described in detail. Here, in the following, a difference from the above-described first embodiment will be mainly described.

<Details of the Learning Unit>

Figure 20:
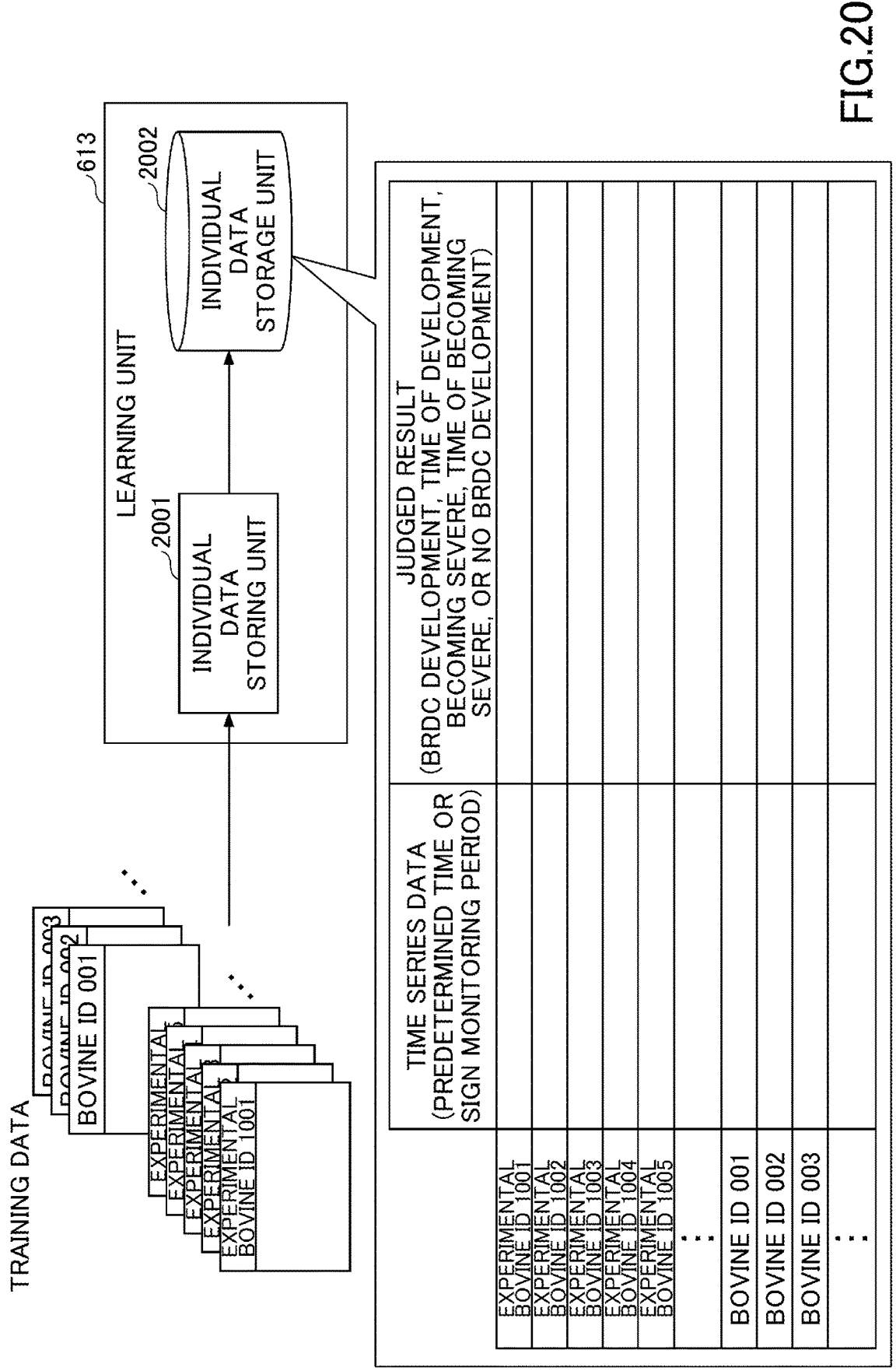
FIG. 20 is a third drawing illustrating the learning unit in detail.

First, the learning unit of the learning device 111 will be described in detail. FIG. 20 is a third drawing illustrating the learning unit in detail.

As illustrated in FIG. 20, the learning unit 613 includes an individual data storing unit 2001.

The individual data storing unit 2001 is an example of the storage unit. The time series data of each data item and the judged results read from the training data storage unit 614 are stored in the individual data storage unit 2002 in association with each other.

<Details of the Sign Detecting Unit>

Next, the sign detecting unit 624 of the detecting device 110 will be described in detail. FIG. 21 is a third drawing illustrating the sign detecting unit in detail. As illustrated in FIG. 21, the sign detecting unit 624 includes a similarity degree determining unit 2101.

The similarity degree determining unit 2101 is an example of a searching unit. The similarity degree determining unit 2101 searches for the time series data of each data item similar to the sign detection data (e.g., the sign detection data 1001) read from the sign detection data storage unit 623 from among the time series data of each data item stored in the individual data storage unit 2002. In the third embodiment, searching for the similar time series data of each data item is equivalent to inferring information indicating whether BRDC will be developed.

Further, the similarity degree determining unit 2101 outputs the judged result (i.e., the information indicating whether BRDC will be developed) associated with the searched time series data of each data item as an inference result.

That is, in the third embodiment, "detecting a sign of the BRDC development" or "notifying that a sign of the BRDC development is detected" is nothing else other than the outputting, by the similarity degree determining unit 2101, information indicating that BRDC will be developed in the judged result associated with the searched result, as an inference.

<Summary>

As is obvious from the above description, the BRDC sign detecting system 100 according to the third embodiment performs the following processes.

store data indicating a condition of a bovine that has developed BRDC within a period required for a fattening process, during a predetermined period in which BRDC is not developed (i.e., the time series data of each data item or the change amount of the time series data of each data item) in association with information indicating that BRDC is developed store data indicating a condition, during a predetermined period, of a bovine that has not developed BRDC as of the end of the time required for the fattening process (i.e., the time series data of each data item or the change amount of the time series data of each data item) in association with information indicating that BRDC is not developed search for, in response to obtaining data indicating a condition of a new bovine during the predetermined time period (i.e., the time series data of each data item or the change amount of the time series data of each data item), the stored data similar to the data indicating the condition during the predetermined period This infers whether the new bovine will develop BRDC.

This can detect a sign of the BRDC development at an early stage in which BRDC is not developed according to the third embodiment.

Fourth Embodiment

In the above-described first to third embodiments, it has been described that as the training data, with respect to both a bovine (or the experimental bovine) that has developed BRDC and a bovine (or the experimental bovine) that does not develop BRDC, the training data is generated.

However, the object of generating the training data is not limited to this, and, for example, the training data may be generated only for the bovine (or the experimental bovine) that has not developed BRDC. In this case, in the first and second embodiments, the sign detecting unit 624 outputs, as an inference result, information indicating that BRDC will be developed in a case where information indicating that BRDC will not developed is not output from the learned model 1101. In the third embodiment, in a case where the individual data storage unit 2002 is searched, and no data is similar, information indicating that BRDC will be developed is output as an inference result.

In the above-described first embodiment, it has been described that only one learned model is generated, but multiple learned models may be generated. For example, the training data may be divided into multiple similar groups, and machine learning may be performed for each group to generate the learned model.

In this case, when the learned model is installed in the sign detecting units 624 and 1424, the training data of the group used to generate a corresponding one of the learned models is stored in each of the sign detecting units 624 and 1424 in association with the corresponding learned model.

Then, the sign detecting units 624 and 1424 search for the training data similar to the sign detection data read from the sign detection data storage units 623 and 1423 and execute the learned models associated with the similar training data to detect a sign of the BRDC development. Here, it is assumed that the sign detecting units 624 and 1424, when searching the training data similar to the sign detection data, compare the time series data during the predetermined period with each other.

In the above-described second embodiment, it has been described that the item of the header information of the training data includes the "previous data" and records the grazing data (e.g., genetic information, past medical history, date of birth of the bovine, place of production, and the like). However, in the "previous data", data other than the grazing data may be recorded.

In the above-described first to third embodiments, it has been described that when performing machine learning on the learning model 901, machine learning is performed including the time of the development and the time of becoming severe. However, machine learning may be performed excluding the time of the development and the time of becoming severe. Alternatively, machine learning may be performed by replacing the time of the development and the time of becoming severe with a predetermined length of time range.

In the above-described first to third embodiments, it has been described that if it is notified that a sign of the BRDC development is detected (if information indicating that BRDC will be developed is output as an inference), isolation treatment or medication treatment is performed. However, it may be configured to perform neither medication treatment nor isolation treatment if the bovine does not become severe even if the information indicating that the BRDC will be developed is output as an inference. This can administer medication only to the bovine that will become severe among the bovines to which medication would have been administered, and not to administer medication to the bovines that are not required for medication. As a result, the effect of reducing the medication cost can be obtained.

In the above-described first to third embodiments, the learning device and the detecting device are separately configured, but the learning device and the detecting device may be integrally configured.

In the above-described first to third embodiments, it has been described that the measurement sites include the head, the neck, and the belly, and the sensors are attached to the measurement sites. However, the sensors may be attached to other measurement sites. A method of attaching to each measurement site can be selected as desired.

In the above-described first to third embodiments, it has been described that the experimental data collecting unit 610 or the feedlot data collecting unit 621 collects the image data, the acceleration data, the temperature data, and the sound data as the experimental data or the feedlot data. However, the data collected by the experimental data collecting unit 610 or the feedlot data collecting unit 621 is not limited to the image data, the acceleration data, the temperature data, and the sound data, and may be another data.

In the above-described first embodiment, it has been described that the experimental data processing unit 611 or the feedlot data processing unit 622 generates the action data, the non-action data, and the vital data. However, the data generated by the experimental data processing unit 611 or the feedlot data processing unit 622 is not limited to the action data, the non-action data, and the vital data, and may be another data.

It should be noted that the present invention is not limited to the above-described configurations, such as the configurations described in the above-described embodiments, and combinations with other elements. In these respects, modification can be made within the scope of the invention without departing from the spirit of the invention, and the configuration can be appropriately determined in accordance with the application form.

The present application is based upon and claims priority to Japanese Patent Application No. 2018-223742 filed on Nov. 29, 2018 and Japanese Patent Application No. 2019-205357 filed on Nov. 13, 2019, the entire contents of which are incorporated herein by reference.

LIST OF REFERENCE NUMERALS

100: BRDC sign detecting system
110: detecting device
111: learning device
130: imaging device group
131: repeater
140: feedlot
150, 160: terminal device
610: experimental data collecting unit
611: experimental data processing unit
612: training data collecting unit
613: learning unit
621: feedlot data collecting unit
622: feedlot data processing unit
624: sign detecting unit
625: first output unit
710: feature extracting unit
720: action data analyzing unit
730: non-action data analyzing unit
740: vital data analyzing unit
800, 800': training data
901: learning model
902: comparing modifying unit
1001: sign detection data
1101: learned model
1300: detected result screen
1403: learning unit
1424: sign detecting unit
1601: preprocessing unit
1801: preprocessing unit
1802: learned model

The invention claimed is:

1. A BRDC sign detecting system comprising:
a processor; and
a memory storing program instructions that cause the processor to:
obtain, with respect to a bovine developing bovine respiratory disease complex (BRDC) within a time period required for a fattening process, first data during a first predetermined time period shorter than a period from infection to development of BRDC in which the bovine did not yet develop the BRDC, and obtain second data during a second predetermined time period extending from an infection point to a fattening completion point of a bovine that has not developed BRDC as of an end of the time period required for the fattening process;
perform machine learning to generate a learned model with respect to a correspondence relation between the obtained first data and second data and information indicating whether BRDC is developed; and
after the machine learning is performed to generate the learned model, infer, by inputting data indicating a condition of a new bovine during the first predetermined time period into the learned model, information indicating whether the new bovine will develop BRDC and output an inference result.

2. The BRDC sign detecting system as claimed in claim 1, wherein the first data during the first predetermined time period is a change amount of time series data indicating the condition during the first predetermined time period from data indicating a healthy condition prior to the first predetermined time period.

3. The BRDC sign detecting system as claimed in claim 1, wherein, in a case where information indicating the new bovine will develop BRDC is output as the inference result, information that identifies the new bovine is output.

4. The BRDC sign detecting system as claimed in claim 1, wherein, in a case where information indicating the new bovine will develop BRDC is output as the inference result, the processor executes instructions to determine whether an isolation treatment should be performed, and the processor outputs an isolation instruction including information that identifies the new bovine.

5. The BRDC sign detecting system as claimed in claim 1, wherein the processor is further configured to process image data imaging the bovine and measurement data measured by a sensor attached to the bovine to generate the first data and second data of each individual bovine.

* * * * *